United States Patent
Hattori et al.

(10) Patent No.: US 9,237,137 B2
(45) Date of Patent: Jan. 12, 2016

(54) KEY GENERATION DEVICE, KEY GENERATION PROGRAM, SECRET SEARCH SYSTEM, AND KEY DISTRIBUTION METHOD

(71) Applicants: Mitsuhiro Hattori, Tokyo (JP); Takato Hirano, Tokyo (JP); Takashi Ito, Tokyo (JP); Nori Matsuda, Tokyo (JP)

(72) Inventors: Mitsuhiro Hattori, Tokyo (JP); Takato Hirano, Tokyo (JP); Takashi Ito, Tokyo (JP); Nori Matsuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/420,995

(22) PCT Filed: Jan. 12, 2013

(86) PCT No.: PCT/JP2013/050495
§ 371 (c)(1),
(2) Date: Feb. 11, 2015

(87) PCT Pub. No.: WO2014/109066
PCT Pub. Date: Jul. 17, 2014

(65) Prior Publication Data
US 2015/0207782 A1    Jul. 23, 2015

(51) Int. Cl.
*H04L 29/06* (2006.01)
*H04L 9/30* (2006.01)

(52) U.S. Cl.
CPC .......... *H04L 63/0428* (2013.01); *H04L 9/3066* (2013.01); *H04L 9/3073* (2013.01); *H04L 2209/42* (2013.01)

(58) Field of Classification Search
CPC .. H04L 9/3066; H04L 9/3073; H04L 63/0428
See application file for complete search history.

(56) References Cited

U.S. PATENT DOCUMENTS

| 8,913,742 B2 | 12/2014 | Takashima et al. |
| 2011/0164746 A1* | 7/2011 | Nice et al. ........................ 380/30 |

(Continued)

FOREIGN PATENT DOCUMENTS

| JP | 2007 235659 | 9/2007 |
| JP | 2007 318583 | 12/2007 |

(Continued)

OTHER PUBLICATIONS

Yuuki Tan, New Security Notions for Public-Key Encryption with Keyword Search, Jan. 20, 2009, SCIS 2009, 6 pages.*

(Continued)

*Primary Examiner* — Jeffrey Pwu
*Assistant Examiner* — Thong Truong
(74) *Attorney, Agent, or Firm* — Oblon, McClelland, Maier & Neustadt, L.L.P.

(57) ABSTRACT

A public parameter PK is key information used in a secret search system having: a transmission device generating and sending an encryption tag which is an encrypted keyword; a server receiving and storing the encryption tag and conducting a secret search in response to a request for the secret search; and a reception device generating a trapdoor which corresponds to a digital signature of the keyword and as well data requesting the secret search, sending the trapdoor to the server, and receiving a search result. The public parameter PK includes a true public parameter PP and a protection key PK'. The transmission device and the reception device require both the true public parameter PP and the protection key PK'; however, the server does not require the protection key PK'. The key generation device generates separately the true public parameter PP and the protection key PK' included in the public parameter PK.

9 Claims, 17 Drawing Sheets

(56) References Cited

U.S. PATENT DOCUMENTS

2013/0039489 A1 2/2013 Takashima et al.
2013/0287206 A1 10/2013 Hattori et al.

FOREIGN PATENT DOCUMENTS

| JP | 2011 141472 | 7/2011 |
|----|-------------|--------|
| JP | 2011 232475 | 11/2011 |
| JP | 2012 79192 | 4/2012 |
| JP | 2012 098649 | 7/2012 |

OTHER PUBLICATIONS

International Search Report Issued Mar. 19, 2013 in PCT/JP13/050495 Filed Jan. 12, 2013.
Boneh, D., et al., "Public Key Encryption That Allows PIR Queries", LNCS, vol. 4622, pp. 50-67, (2007).
Tan, Y., et al., "New Security Notions fo Public-Key Encryption with Keyword Search", SCIS, pp. 1-6, (Jan. 20-23, 2009).
Camenisch, J., et al., "Blind and Anonymous Identity-Based Encryption and Authorised Private Searches on Public Key Encrypted Data", LNCS, vol. 5443, pp. 196-214, (2009).
Tang, Q., et al., "Public Key Encryption with Registered Keyword Search", LNCS, vol. 6391, pp. 163-178, (2010).
Nishioka, M., "Perfect Keyword Privacy in PEKS Systems", PROVSEC, LNCS, vol. 7496, pp. 175-192, (2012).
Hattori, M., et al., "Formulation and Evaluation of Trapdoor Security in PEKS Systems", SCIS, pp. 1-8, (Jan. 22-25, 2013).
Boneh, D., et al., "Public Key Encryption with keyword Search", EUROCRYPT, LNCS, vol. 3027, Total 15 Pages, (2004).
Katz, J., et al., "Predicate Encryption Supporting Disjunctions, Polynomial Equations, and Inner Products", EUROCRPYT LNCS, vol. 4965, Total 28 Pages, (2008).
Okamoto, T., et al., "Adaptively Atribute-Hiding (Hierarchical) Inner Product Encryption", EUROCRYPT, LNCS, vol. 7237, Total 18 Pages, (2012).
Hattori, M., et al. "Ciphertext-Policy Delegatable Hidden Vector Encryption and its Application to Searchable Encryption in Multi-user Setting", IMA International Conference on Cryptography and Coding LNCS, vol. 7089, Total 20 Pages, (2011).
Shen, E., et al., "Predicate Privacy in Encryption Systems", Theory of Cryptography Conference, LNCS, vol. 5444, Total 33 Pages, (2009).
Nishioka, M., "Perfect Keyword Privacy in PEKS Systems", PROVSEC, LNCS, vol. 7496, Total 25 Pages, (2012).

* cited by examiner $$PK = \left( \underbrace{N = pqr, G, G_T, \hat{e}, g_p, g_r, Q = g_q R_0}_{\text{TRUE PUBLIC PARAMETER PP}}, \underbrace{\{H_{1,i} = h_{1,i} R_{1,i}, H_{2,i} = h_{2,i} R_{2,i}\}_{i=1}^{n}}_{\text{PROTECTION KEY PK'}} \right)$$

$$SK = \left( p, q, r, g_q, \{h_{1,i}, h_{2,i}\}_{i=1}^{n} \right)$$

Fig. 8

|  | SENDER | SERVER | RECEIVER |
|---|---|---|---|
| CIPHERTEXT | ENCRYPTION TAG | (SECRET SEARCH) | TRAPDOOR |
| KEY | PUBLIC PARAMETER (PK=PP, PK') | TRUE PUBLIC PARAMETER PP OUT OF PUBLIC PARAMETER | PUBLIC PARAMETER (PK=PP, PK') AND MASTER SECRET KEY (SK) |

Fig. 12

|  | ALGORITHM FOR THE USE OF FUNCTIONAL CRYPTOSYSTEM | ALGORITHM FOR THE USE OF PUBLIC-KEY ENCRYPTION WITH KEYWORD SEARCH |
|---|---|---|
| NON-PATENT LITERATURE 2 | "A Full-Fledged Predicate Encryption Scheme" IN APPENDIX B | "Predicate-Only Version" IN SECTION 4 |
| NON-PATENT LITERATURE 3 | "Proposed (Basic) IPE Scheme" IN SECTION 4 | ALGORITHM DESCRIBED IN SECOND EMBODIMENT |

Fig. 13

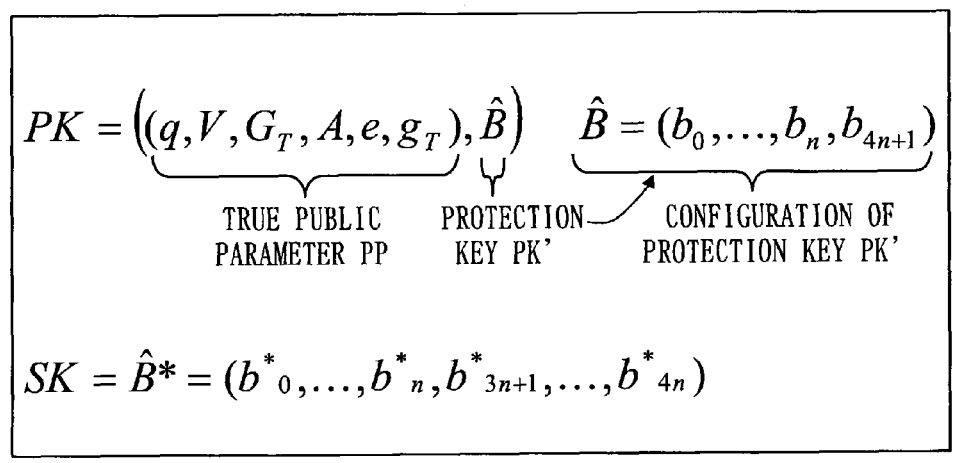

$$PK = \underbrace{\left((q, V, G_T, A, e, g_T), \hat{B}\right)}_{\text{TRUE PUBLIC PARAMETER PP}} \quad \underbrace{\hat{B} = (b_0, \ldots, b_n, b_{4n+1})}_{\text{CONFIGURATION OF PROTECTION KEY PK'}}$$

PROTECTION KEY PK'

$$SK = \hat{B}^* = (b^*_0, \ldots, b^*_n, b^*_{3n+1}, \ldots, b^*_{4n})$$

KEY GENERATION DEVICE, KEY GENERATION PROGRAM, SECRET SEARCH SYSTEM, AND KEY DISTRIBUTION METHOD

TECHNICAL FIELD

The present invention relates to a secret search system for conducting a secret search, a key generation device, a key generation program, and a key distribution method of a key used in the secret search system.

BACKGROUND ART

In the field of public key cryptography (PKC), public-key encryption with keyword search (PEKS) is known as technique which enables a keyword search while the keyword is encrypted (for instance, Non-Patent Literature 1). In the following, the public-key encryption with keyword search will be referred to as PEKS.

The PEKS implements, for instance, applications like the following. It is assumed that "a sender sends a data file including confidential information via an external database ("server", hereinafter) to a receiver". That is, a case is considered, in which the sender uploads the data file to the server, and the receiver downloads his necessary data file from the server using a keyword search. Here, the sender and the receiver want to share both of the data file and the keyword, while the server is unaware of them.

The receiver prepares a pair of a public key and a secret key of the public key cryptography (used for encrypting and decrypting the data file itself) and a pair of a public key and a secret key of PEKS (used for encrypting a keyword and generating a search query) beforehand. Then, the receiver releases both public keys.

The sender encrypts the data file using the public key of the public key cryptography of the receiver and generates ciphertext of the data file. In addition to the above, the sender encrypts the keyword using the public key of PEKS to generate ciphertext of the keyword. In the following, the ciphertext of the keyword generated by using the public key of PEKS is referred to as an "encryption tag". The sender uploads the ciphertext of the data file with the encryption tag to the server.

The receiver generates data corresponding to a digital signature of the keyword using the secret key of PEKS. In the following, data corresponding to the digital signature of the keyword generated by using the secret key of PEKS is referred to as a "trapdoor". The receiver sends the trapdoor to the server as a search query. The server conducts a secret search of ciphertext of all the data files of the database for each encryption tag using the received trapdoor. Then, the server sends the ciphertext of the data file hit by the secret search to the receiver.

In this manner, PEKS takes an essential role upon implementing an outsourcing application of the encrypted data.

CITATION LIST

Patent Literature

Patent Literature 1: JP2011-141472A
Patent Literature 2: WO2012/098649A

Non-Patent Literature

Non-Patent Literature 1: Dan Boneh, Giovanni Di Crescenzo, Rafail Ostrovsky and Giuseppe Persiano, "Public Key Encryption with Keyword Search," Eurocrypt 2004, Lecture Notes in Computer Science, vol. 3027, pp. 506-522, 2004.

Non-Patent Literature 2: Jonathan Katz, Amit Sahai and Brent Waters, "Predicate Encryption Supporting Disjunctions, Polynomial Equations, and Inner Products," Eurocrypt 2008, Lecture Notes in Computer Science, vol. 4965, pp. 146-162, 2008.

Non-Patent Literature 3: Tatsuaki Okamoto and Katsuyuki Takashima, "Adaptively Attribute-Hiding (Hierarchical) Inner Product Encryption", Eurocrypt 2012, Lecture Notes in Computer Science, vol. 7237, pp. 591-608, 2012.

Non-Patent Literature 4: Mitsuhiro Hattori, Takato Hirano, Takashi Ito, Nori Matsuda, Takumi Mori, Yusuke Sakai and Kazuo Ohta, "Ciphertext-Policy Delegatable Hidden Vector Encryption and Its Application to Searchable Encryption in Multi-user Setting," IMA International Conference on Cryptography and Coding, Lecture Notes in Computer Science, vol. 7089, pp. 190-209, 2011.

Non-Patent Literature 5: Emily Shen, Elaine Shi and Brent Waters, "Predicate Privacy in Encryption Systems," Theory of Cryptography Conference 2009, Lecture Notes in Computer Science, vol. 5444, pp. 457-473, 2009.

Non-Patent Literature 6: Mototsugu Nishioka, "Perfect Keyword Privacy in PEKS Systems," ProvSec 2012, Lecture Notes in Computer Science, vol. 7496, pp. 175-192, 2012.

SUMMARY OF INVENTION

Technical Problem

With regard to PEKS, among the encryption tag and the trapdoor which are data related to the keyword, a number of researches for the safety of the encryption tag has been conducted and a number of methods for satisfying the safety of the encryption tag has been proposed. For instance, in Patent Literature 1, Patent Literature 2, and Non-Patent Literatures 1 to 4, various environments of usage of PEKS are considered, and safety models which define "what means an encryption tag is safe under various environments of usage" are proposed. Further, a method which mathematically proves the safety in the safety model is proposed.

However, with respect to the "trapdoor" which is the other data, except for Non-Patent Literatures 5 and 6, research for the safety or proposal for a method for satisfying the safety has been rarely done.

Non-Patent Literature 5 discloses a method in which the public key is not released at all but treated similarly to the secret key, thereby securing the safety of the trapdoor. However, to treat the public key similarly to the secret key without releasing at all means that such a method can be only applied to applications where the sender and the receiver are the same person. Consequently, there is a problem that applicable applications are limited.

Further, Non-Patent Literature 6 discloses a method for securing the safety of the trapdoor using a secure injective-function. However, this method can be applied only to an exact match search of a single keyword; and thus there is a problem that the method is not applicable to an AND/OR search shown in Non-Patent Literature 2 and Non-Patent Literature 3.

The present invention is provided to solve the above problems; and in PEKS, it is one of the objects to provide a general method for securing the safety of the trapdoor.

Solution to Problem

According to the present invention, a key generation device of key information used in a secret search system having:

a transmission device generating encrypted data and an encryption tag which is an encrypted keyword for searching the encrypted data;

a server device receiving from the transmission device and storing the encrypted data and the encryption tag, and also conducting a secret search in response to a request for the secret search; and a reception device generating a trapdoor which is data corresponding to a digital signature of the keyword and also data requesting the server device to conduct the secret search of the encrypted data, sending the trapdoor to the server device, and receiving a result of the secret search from the server device, the key generation device includes:

a first generation unit which generates a true public parameter PP included in a public parameter PK, the public parameter PK being the key information including:

the true public parameter PP used for encryption of the keyword by the transmission device, generation of the trapdoor by the reception device, and the secret search by the server device; and a protection key PK' used for the encryption of the keyword by the transmission device and the generation of the trapdoor by the reception device; and a second generation unit which generates the protection key PK' included in the public parameter PK separately from the true public parameter PP generated by the first generation unit.

Advantageous Effects of Invention

A key generation device of the present invention generates separately the true public parameter PP and the protection key PK' included in the public parameter, thereby increasing the safety of the trapdoor.

BRIEF DESCRIPTION OF DRAWINGS

FIG. 8 is a table summarizing the key information used for the generation of the encryption tag, the generation of the trapdoor, and the secret search according to the first embodiment.

FIG. 12 is a list tabulating, with respect to Non-Patent Literature 2 and Non-Patent Literature 3, algorithms for the use of a functional cryptosystem and algorithms for the use of PEKS according to a second embodiment.

FIG. 13 shows a configuration of a public parameter PK and a master secret key SK according to the second embodiment.

DESCRIPTION OF EMBODIMENTS

In the following, specific contents of the present invention will be explained by showing embodiments. The first embodiment will disclose a method for securing the safety of the trapdoor in case of PEKS described in Non-Patent Literature 2. The second embodiment will disclose a method for securing the safety of the trapdoor in case of using the functional cryptosystem described in Non-Patent Literature 3 for PEKS.

First, a configuration common to each of the following embodiments will be explained.

Figure 1:
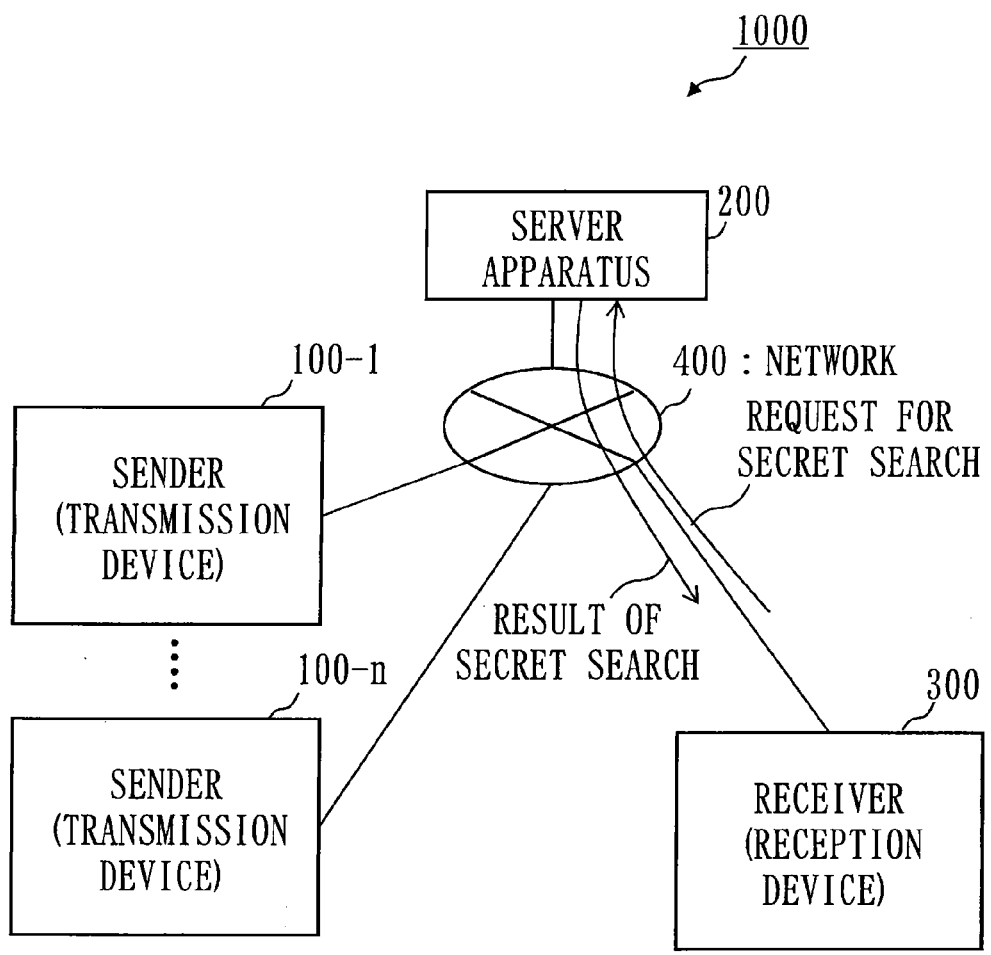
FIG. 1 is a configuration diagram of a secret search system 1000 according to a first embodiment.

FIG. 1 is a configuration diagram of a secret search system 1000 which is common to each of the embodiments.

(1) Senders 100-1 to 100-n show generators of encryption tags. Note that n is an arbitrary integer showing the number of senders who generate encryption tags for PEKS. Note that substances of the senders 100-1 to 100-n are transmission devices used by the senders. Accordingly, the senders 100-1 to 100-n mean the transmission devices 1 to n used by the senders. In the following, the senders 100-1 to 100-n are sometimes described as the transmission devices 100-1 to 100-n. Further, the senders are described simply as a sender 100 (transmission device 100) when there is no need to discriminate each sender (each transmission device).

(2) A receiver 300 shows a generator of a public key, a master secret key, and a trapdoor. Note that a substance of the receiver 300 is a reception device used by the receiver 300. Accordingly, the receiver 300 means the reception device used by the receiver 300. In the following, the receiver 300 is sometimes described as the reception device 300.

(3) A server device 200 (server 200, hereinafter) means an external database. It is assumed that these devices are connected via a network 400 such as the Internet.

(4) As shown in FIG. 1, the secret search system 1000 includes the transmission devices 100-1 to 100-n, the server 200, and the reception device 300.

Here, upon implementing an outsourcing application of the encrypted data using PEKS, the senders 100-1 to 100-n become the senders of the encrypted data, and the receiver 300 becomes the receiver 300 of the encrypted data. Further, the server 200 is an external database. The server 200 takes the encrypted data and the encryption tag from the sender 100. The server 200, in response to a secret search request (trapdoor) sent from the receiver 300, conducts the secret search using the trapdoor sent from the receiver 300 and a public parameter PK (in fact, a true public parameter PP out of the public parameter PK as will be shown in FIG. 6) distributed from the receiver 300, and returns the encrypted data hit by the search to the receiver 300.

Here, to facilitate the explanation, it is assumed there is one receiver 300; however, a plurality of receivers 300 may exist. In this case, there is another method, which will be described later (FIG. 2), to implement a setup algorithm by each receiver individually. Further, as an application of PEKS, a method using an algorithm containing a hierarchical structure such as Hierarchical Inner-product Encryption is applied, thereby implementing an outsourcing application of the encrypted data similarly to the case where there is one receiver.

Embodiment 1

A first embodiment will disclose a method to secure safety of a trapdoor for PEKS described in Non-Patent Literature 2. First, among the algorithms of PEKS described in Non-Patent Literature 2, a part related to the first embodiment will be explained. Hereinafter, it is assumed "the algorithms of PEKS described in Non-Patent Literature 2" means an algorithm of predicate-only version described in "Our Main Construction" in Section 4 of Non-Patent Literature 2. Appendix Section B of Non-Patent Literature 2 shows, as "A Full-Fledged Predicate Encryption Scheme", an algorithm where the algorithm of Section 4 is developed and used as a so-called functional cryptosystem; however, it is easy for those skilled in the art to understand the algorithm of the 4th section is sufficient to use for PEKS.

Figure 2:
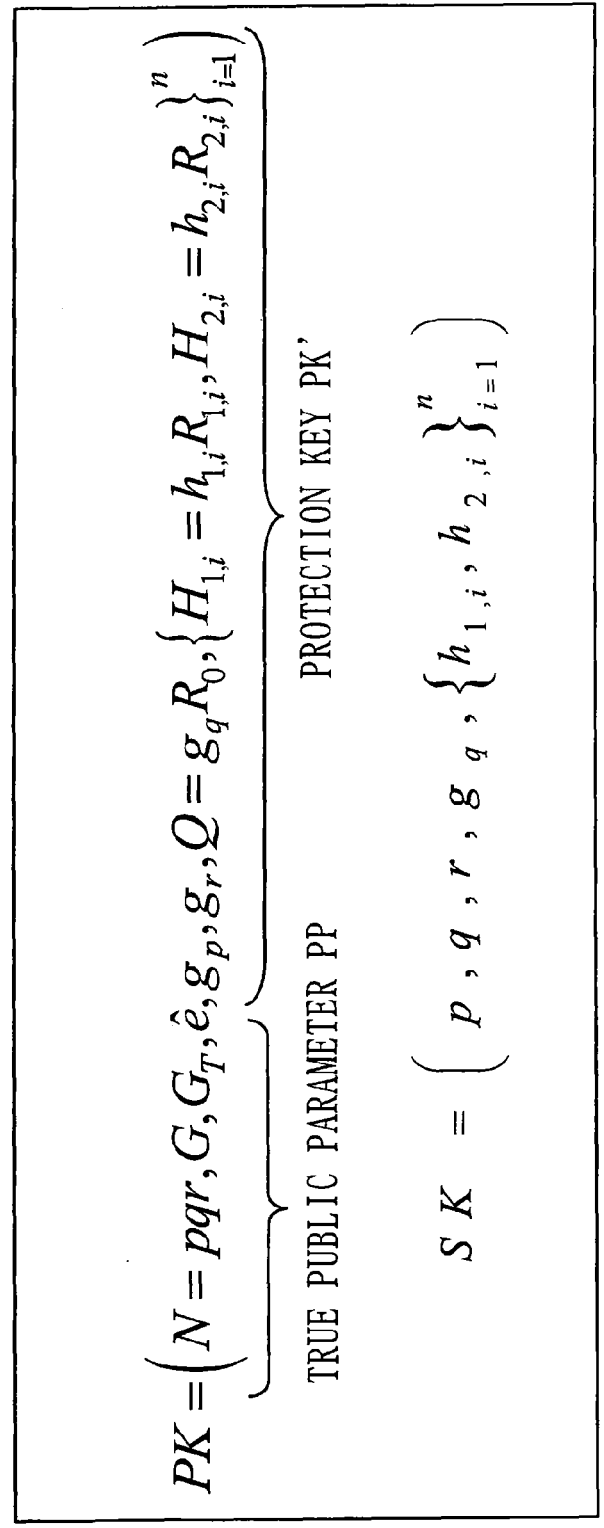
FIG. 2 shows a configuration of a public parameter PK and a master secret key SK according to the first embodiment.

FIG. 2 shows configurations of a public parameter PK and a master secret key SK generated by implementing the setup algorithm among the algorithms of PEKS described in Non-Patent Literature 2.

In FIG. 2,
(1) p, q, and r respectively show prime numbers.
(2) G shows a cyclic group of an order N=pqr on an elliptic curve for which the pairing operation $\hat{e}:G \times G \rightarrow G_T$ is possible.
(3) $G_T$ shows a cyclic group of the order N after the pairing operation.
(4) $\hat{e}$ shows the pairing operation.
(5) $g_p$, $g_q$, and $g_r$ show generators of subgroups of "$G_p$, $G_q$, $G_r$ of which the orders are p, q, and r, respectively".
(6) $R_0$ shows an element selected uniformly at random on the group $G_r$.
(7) $\{h_{1,i}, h_{2,i}\}_{i=1,\ldots,n}$ show elements selected uniformly at random on the $G_p$.

Note that n shows the number of degrees of the predicate vector used for generation of the encryption tag and generation of the trapdoor.
(8) $\{R_{1,i}, R_{2,i}\}_{i=1,\ldots,n}$ show elements selected uniformly at random on the group $G_r$.

In the algorithms of PEKS described in Non-Patent Literature 2, it is assumed that all entities using PEKS (in an example of FIG. 1, the senders 100-1 to 100-n, the server 200, and the receiver 300) share the information of the public parameter PK. As will be discussed later, in a decryption (Dec) algorithm which is an algorithm used when the server 200 conducts the secret search, the information of the public parameter PK is used.

The first embodiment is characterized in a method to distribute the public parameter PK to each entity. That is, the first embodiment aims to deal with the distribution method of the public parameter PK, thereby securing the safety of the trapdoor. The details will be discussed in the explanation of FIG. 6.

Here, as shown in FIG. 2, to facilitate the explanation below, the following is assumed in the first embodiment,
The part of "N, G, $G_T$, $\hat{e}$" are called as a true public parameter PP, and
the other structural elements, that is,
the part of "$g_p$, $g_r$, Q, $\{H_{1,i}, H_{2,i}\}_{i=1,\ldots,n}$" is called as a protection key PK'.

That is, it is assumed that the public parameter PK generated at the setup algorithm described in Non-Patent Literature 2 is composed of the true public parameter PP and the protection key PK'. The difference between the true public parameter PP and the protection key PK' will be clearly explained later.

(Generation of an Encryption Tag)

Next, with reference to FIG. 3, among the algorithms of PEKS described in Non-Patent Literature 2, the procedure of an encryption (Enc) algorithm which is an algorithm used when the sender 100 generates an encryption tag will be discussed. Accordingly, a subject of the operation of FIG. 3 is the sender (the transmission device) When generating the encryption tag, the sender 100 generates an encryption tag using the public parameter PK (both of PP and PK') distributed by the receiver 300.

Figure 3:
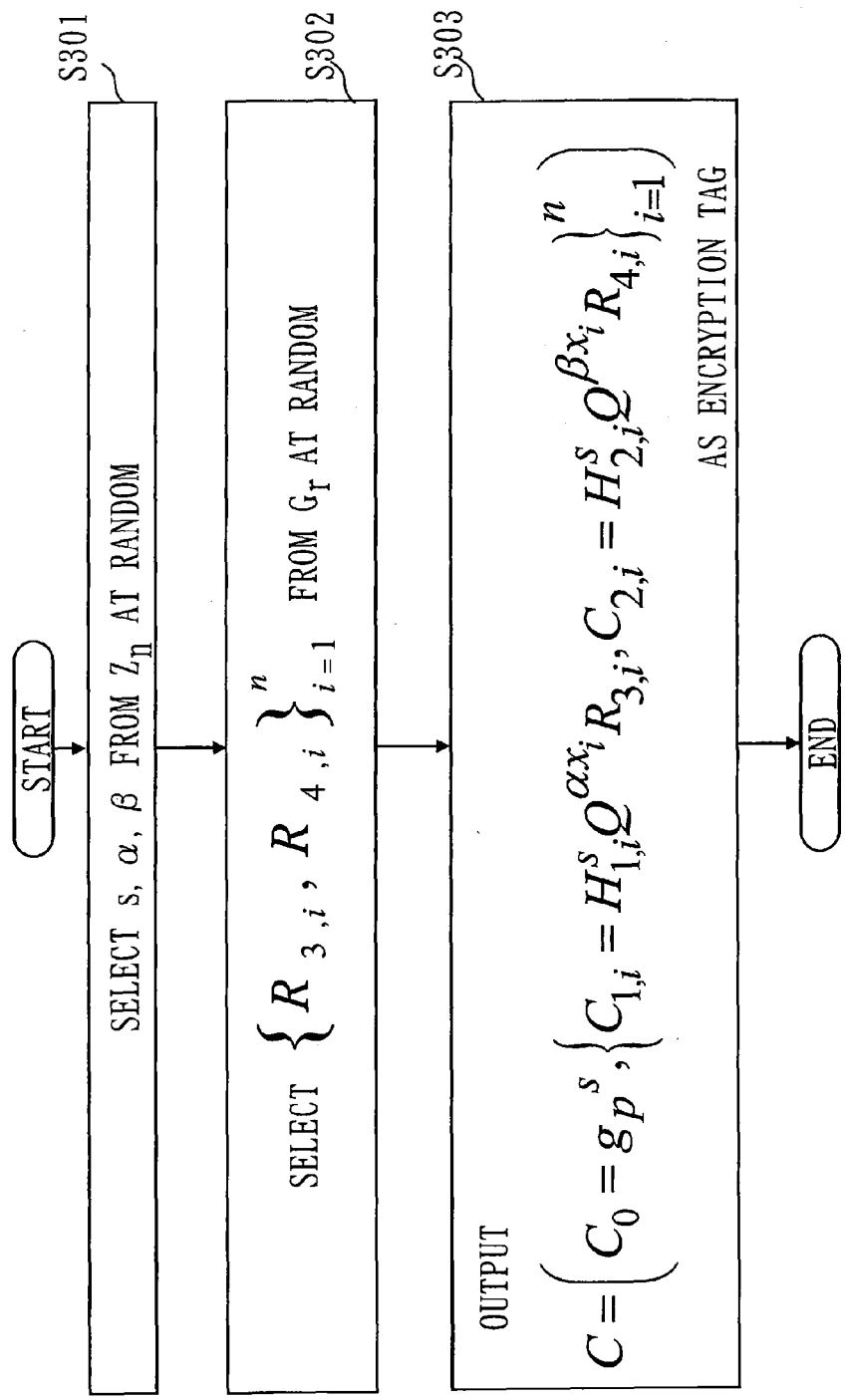
FIG. 3 is a flowchart showing an encryption (Enc) algorithm used for generating an encryption tag according to the first embodiment.

FIG. 3 is a flowchart showing the procedure of the encryption (Enc) algorithm.

In FIG. 3, it is assumed that
the sender 100 wants to encrypt
an attribute vector $\vec{x}=(x_1, x_2, \ldots, x_n) \in Z_N^n$ to generate an encryption tag.

Note that
the attribute vector $\vec{x} \in Z_N^n$
is data corresponding to the keyword to be encrypted, which is data having a different format according to the contents of the search such as an exact match search, an AND search, an OR search, and the like. For instance, in case of the exact match search of one keyword,
$\vec{x}=(1, keyword)$.

Note that
$Z_N$ represents a set of integers from 0 to N−1.
Further, the above "keyword" of $\vec{x}=(1, keyword)$
is an integer keyword, and the same can be said for the other cases which will be discussed below.

(1) In FIG. 3, first, the sender 100 selects s, α, and β at random from $Z_n$ at the step S301.
(2) Next, at the step S302, the sender 100 selects $$\{R_{3,i}, R_{4,i}\}_{i=1}^n \qquad \text{[Formula 1]}$$

at random from the group $G_r$.
(3) Finally, the sender 100 outputs $$C=(C_0=g_p^s, \{C_{1,i}=H_{1,i}^s Q^{\alpha x_i} R_{3,i}, C_{2,i}=H_{2,i}^s Q^{\beta x_i} R_{4,i}\}_{i=1}^n) \qquad \text{[Formula 2]}$$

as the encryption tag at the step S303.

In the procedure of the encryption (Enc) algorithm shown in FIG. 3, the public parameter PK is required for performing the process of the steps S301 and S302. In particular, for performing the process of the step S302, the protection key PK' of the public parameter PK=(PP, PK') is required.

(Generation of the Trapdoor)

Figure 4:
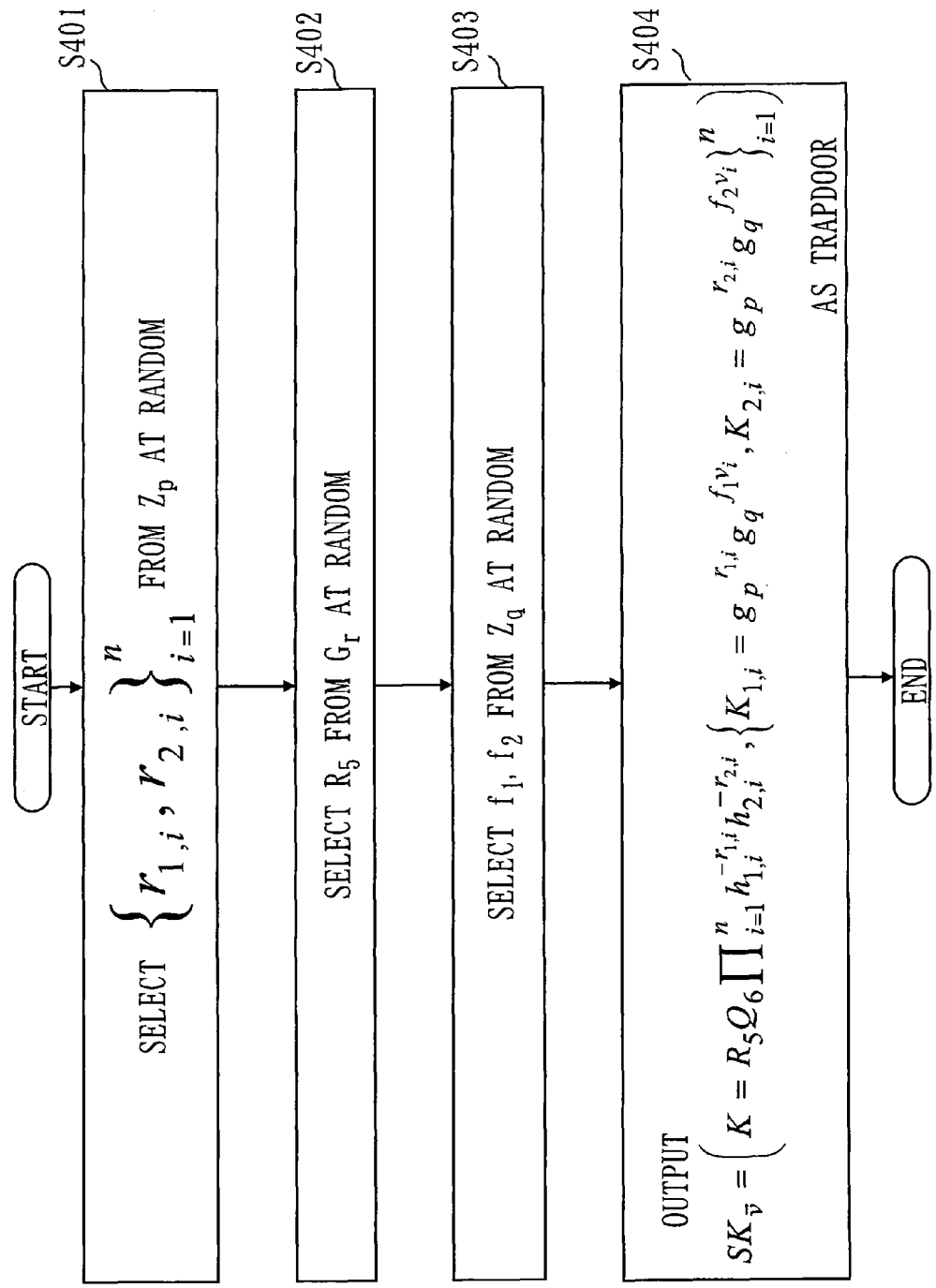
FIG. 4 is a flowchart showing a key generation (GenKey) algorithm used for generating a trapdoor according to the first embodiment.

Next, with reference to FIG. 4, among the algorithms of PEKS described in Non-Patent Literature 2, the procedure of the key generation (GenKey) algorithm, which is an algorithm used when the receiver 300 generates the trapdoor, will be explained. Accordingly, the subject of the operation of FIG. 4 is a receiver (the reception device). The receiver 300 generates the trapdoor using the public parameter PK (both PP and PK') and the master secret key SK shown in FIG. 2.

FIG. 4 is a flowchart showing the procedures of the key generation (GenKey) algorithm.

In FIG. 4, it is assumed that the receiver 300 wants to sign digitally on the predicate vector $\vec{v}=(v_1, v_2, \ldots, v_n) \epsilon Z_N^n$ to generate the trapdoor.

Note that the predicate vector $\vec{v} \epsilon Z_N^n$ is data corresponding to the keyword to be searched, which is data having a different format according to the contents of the search such as an exact match search, an AND search, an OR search, and the like.

For instance, in case of the exact match search of one keyword, $\vec{v}=$(keyword, N−1).

(1) In FIG. 4, the receiver 300, first at the step S401, selects $$\{r_{1,i}, r_{2,i}\}_{i=1}^n \qquad \text{[Formula 3]}$$

from $Z_p$ at random.

(2) Next, at the step S402, the receiver 300 selects $R_5$ at random from $G_r$.

(3) Next, at the step S403, the receiver 300 selects $f_1$, $f_2$ from $Z_q$.

(4) Finally, at the step S404, the receiver 300 outputs $$SK_{\vec{v}} = \left( K = R_5 Q_6 \prod_{i=1}^n h_{1,i}^{-r_{1,i}} h_{2,i}^{-r_{2,i}}, \right.$$

$$\left. \{K_{1,i} = g_p^{r_{1,i}} g_q^{f_1 v_i}, K_{2,i} = g_p^{r_{2,i}} g_q^{f_2 v_i}\}_{i=1}^n \right) \qquad \text{[Formula 4]}$$

as the trapdoor.

(Secret Search by the Server 200)

Figure 5:
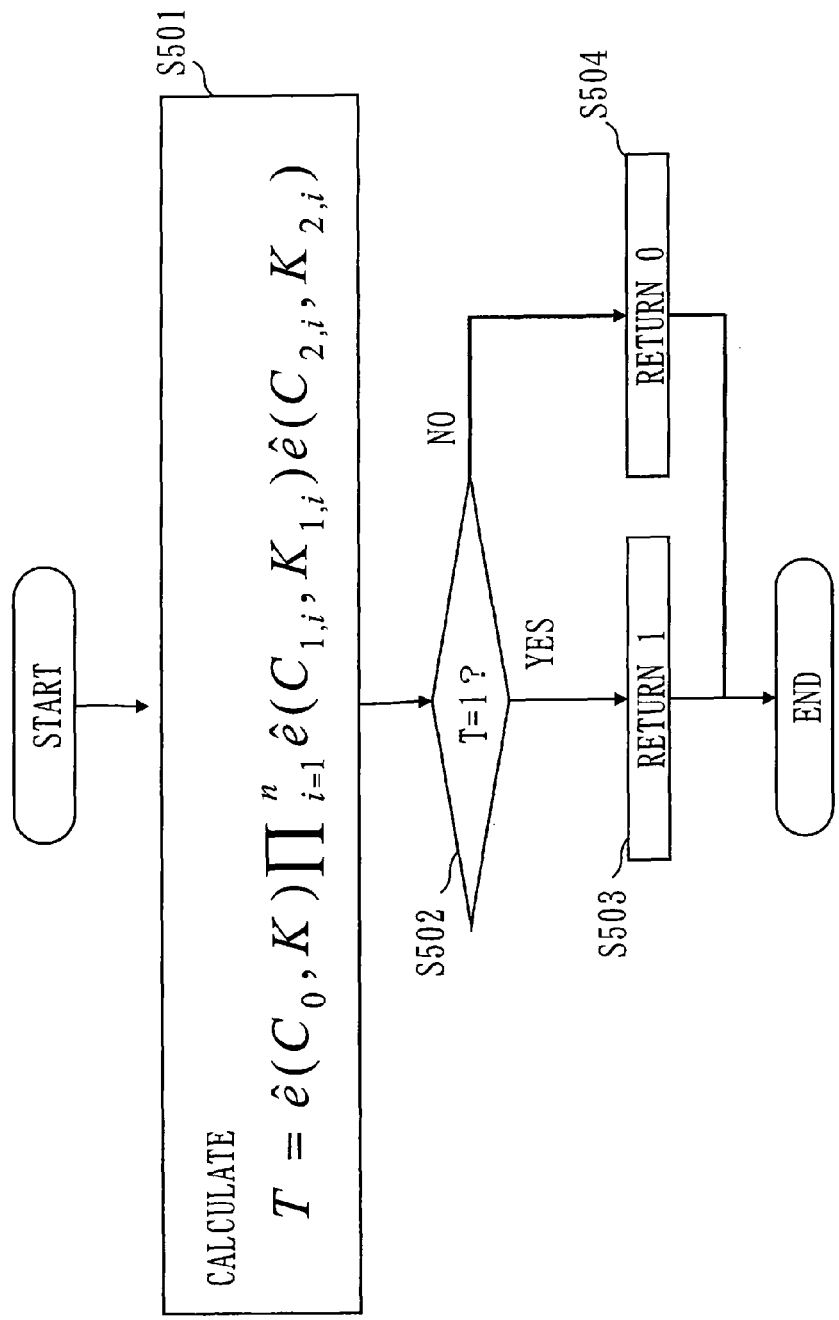
FIG. 5 is a flowchart showing a decryption (Dec) algorithm used for a secret search of a server 200 according to the first embodiment.

Next, with reference to FIG. 5, the procedure of the decryption (Dec) algorithm which is an algorithm used when the server 200 conducts the secret search will be discussed. Accordingly, the subject of the operation of FIG. 5 is the server 200. In the secret search by the server 200, the server 200 conducts the secret search for each of a plurality of encryption tags sent from a plurality of senders based on one trapdoor sent from the receiver. When conducting the secret search, as will be discussed later, the true public parameter PP is required out of the public parameter PK. In other words, as shown in FIG. 2, the public parameter PK includes the true public parameter PP and the protection key PK'; however, the protection key PK' may be unnecessary for the secret search by the server 200.

FIG. 5 is a flowchart showing the procedure of the decryption (Dec) algorithm.

(1) In FIG. 5, the server 200, first at the step S501, calculates $$T = \hat{e}(C_0, K) \Pi_{i=1}^n \hat{e}(C_{1,i}, K_{1,i}) \hat{e}(C_{2,i}, K_{2,i}) \qquad \text{[Formula 5]}$$

(2) Next, at the step S502, the server 200 determines if T=1. If T=1 holds, 1 is returned and the process terminates at the step S503.

If T=1 does not hold, 0 is returned and the process terminates at the step S504.

(Separation Standard of PP and PK')

In the procedure of the decryption (Dec) algorithm, the public parameter PK is required for implementing the process of the step S501.

However, the step only requires the part of the true public parameter PP out of the public parameter PK=(PP, PK'), and the part of the protection key PK' is not required. This is separation standard of the true public parameter PP and the protection key PK' shown in FIG. 2. That is, the protection key PK' is, out of the components of the public parameter PK, a component which is required for the encryption algorithm (generation of the encryption tag by the sender and generation of the trapdoor by the receiver) but not required for the decryption algorithm (secret search by the server). Further, the true public parameter PP is, out of the components of the public parameter PK, a component which is required for both of the encryption algorithm and the decryption algorithm.

Hereinbefore, among the algorithms of PEKS described in Non-Patent Literature 2, a part related to the first embodiment has been explained.

Figure 6:
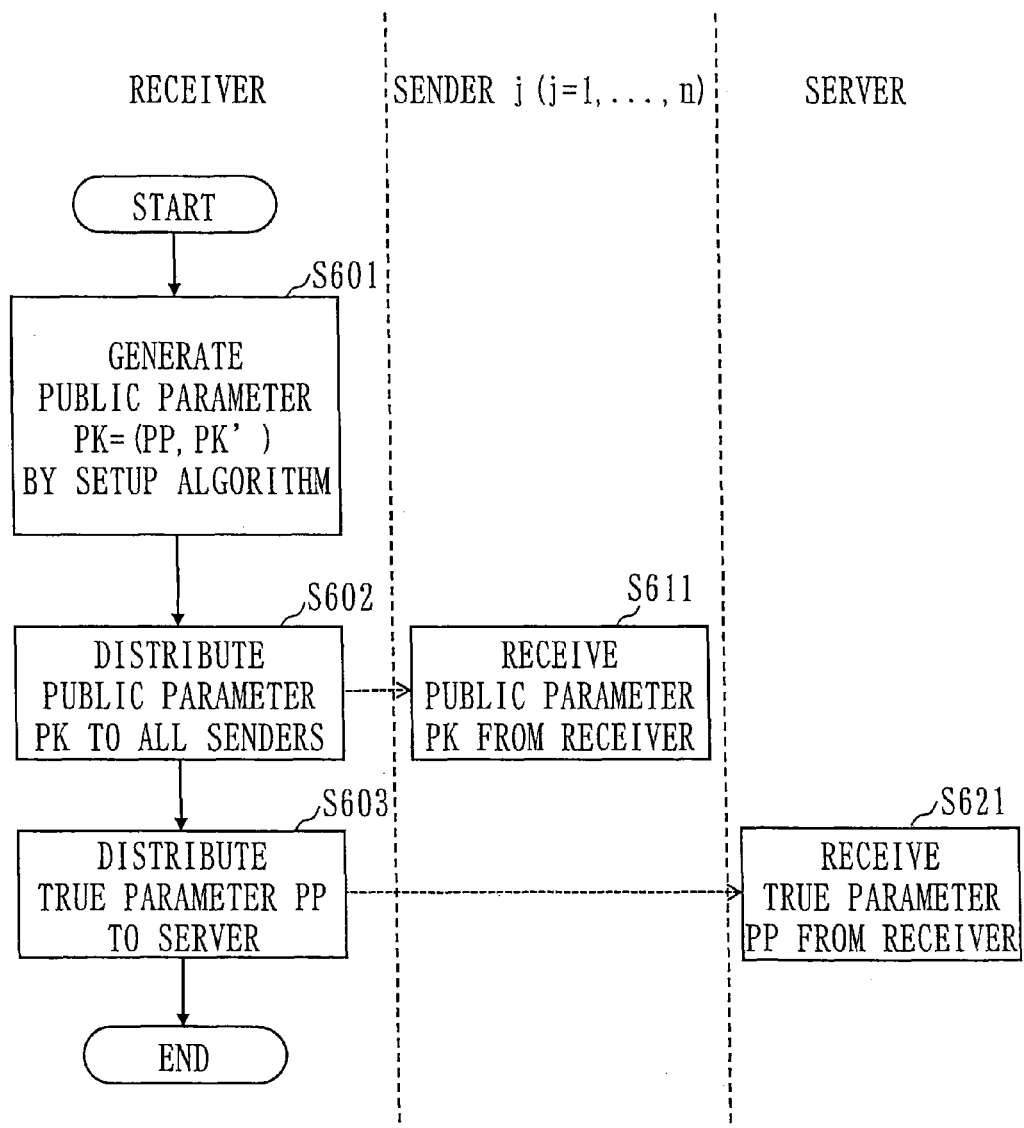
FIG. 6 is a flowchart showing a distribution method of a public parameter PK and the like from a receiver 300 to a sender 100 and the server 200 according to the first embodiment.

Next, with reference to FIG. 6, the distribution method of the public parameter PK to each entity (key distribution method) according to the first embodiment will be explained. FIG. 6 is a flowchart showing the distribution procedure of the public parameter PK from the receiver 300 to the sender 100 and the server 200 according to the first embodiment.

(Receiver 300)

(1) First, the receiver 300 generates, at the step S601, the public parameter PK=(PP, PK')

using the setup algorithm. The specific generation method of the public parameter PK conforms to the setup algorithm described in Non-Patent Literature 2. Further, the separation of the true public parameter PP and the protection key PK' is as described above. (2) Next, the receiver 300 distributes, at the step S602, the public parameter PK to the senders 100-1 to 100-n. At this time, it is desired to distribute the public parameter PK in a manner by which the protection key PK' is not leaked to the server 200. The following (a) and (b) are examples of such distribution method.

Here, in case of a key generation device 310-1 and the like which will be described later with reference to FIGS. 9 to 11, the public parameter PK can be distributed in a state where the true public parameter PP and the protection key PK' are separated.

(a) There is a method to distribute off-line the protection key PK' directly to the sender. For example, such a method is to deliver the protection key PK' directly and personally to all the senders 100 by storing in a storage medium such as an IC card.

(b) For another example, there is a method to display the protection key PK' on an electronic bulletin board on the network which can be browsed only by the sender 100. The sender 100 obtains the protection key PK' via the electronic bulletin board.

(3) Finally, the receiver 300 distributes, at the step S603, the true public parameter PP out of the public parameter PK to the server 200. It is unnecessary to try to prevent the leakage when distributing to the server 200.

(Sender 100)

Each of the senders 100-1 to 100-n receives, at the step S611, the public parameter PK from the receiver 300. The received public parameter PK is stored in data storage equipment such as an IC card.

(Server 200)

The server 200 receives, at the step S621, the true public parameter PP from the receiver 300. The received true public parameter PP is stored in the data storage equipment.

Figure 7:
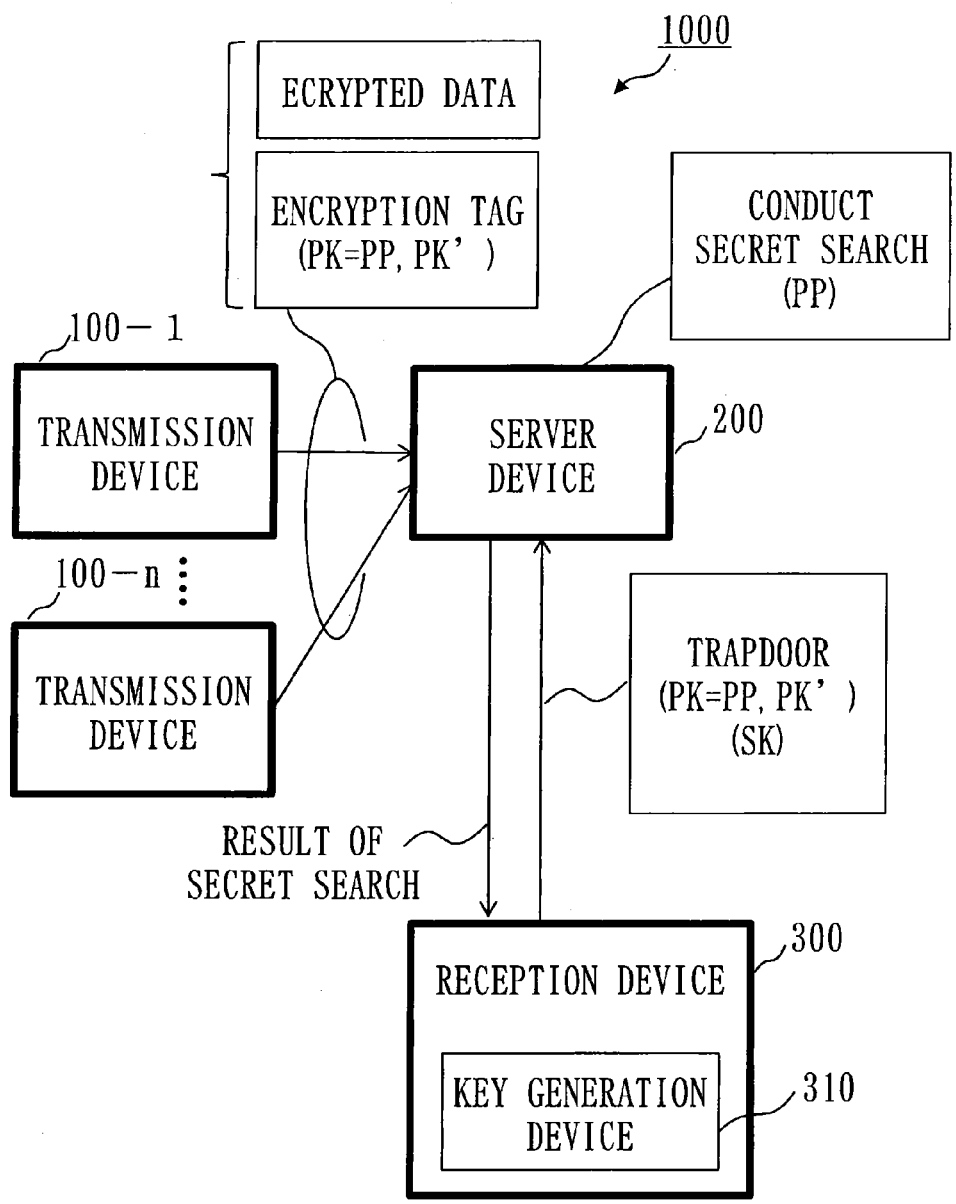
FIG. 7 is a diagram summarizing key information used for generation of the encryption tag, generation of the trapdoor, and secret search according to the first embodiment.

FIG. 7 summarizes the key information related to the distribution method of the public parameter PK and the like discussed with reference to FIG. 6, that is, the key information of the public parameter PK and the like used for the generation of the encryption tag by the sender 100, the generation of the trapdoor by the receiver 300, and the secret search by the server 200. FIG. 8 is a table-formatted FIG. 7. As shown in FIGS. 7, 8, and the like, the sender 100 uses the public parameter PK=(PP, PK') for the generation of the encryption tag. The receiver 300 uses the public parameter PK=(PP, PK') and the master secret key SK for the generation of the trapdoor. The server 200 uses only the true public parameter PP out of the public parameter PK=(PP, PK') for the secret search.

Figure 9:
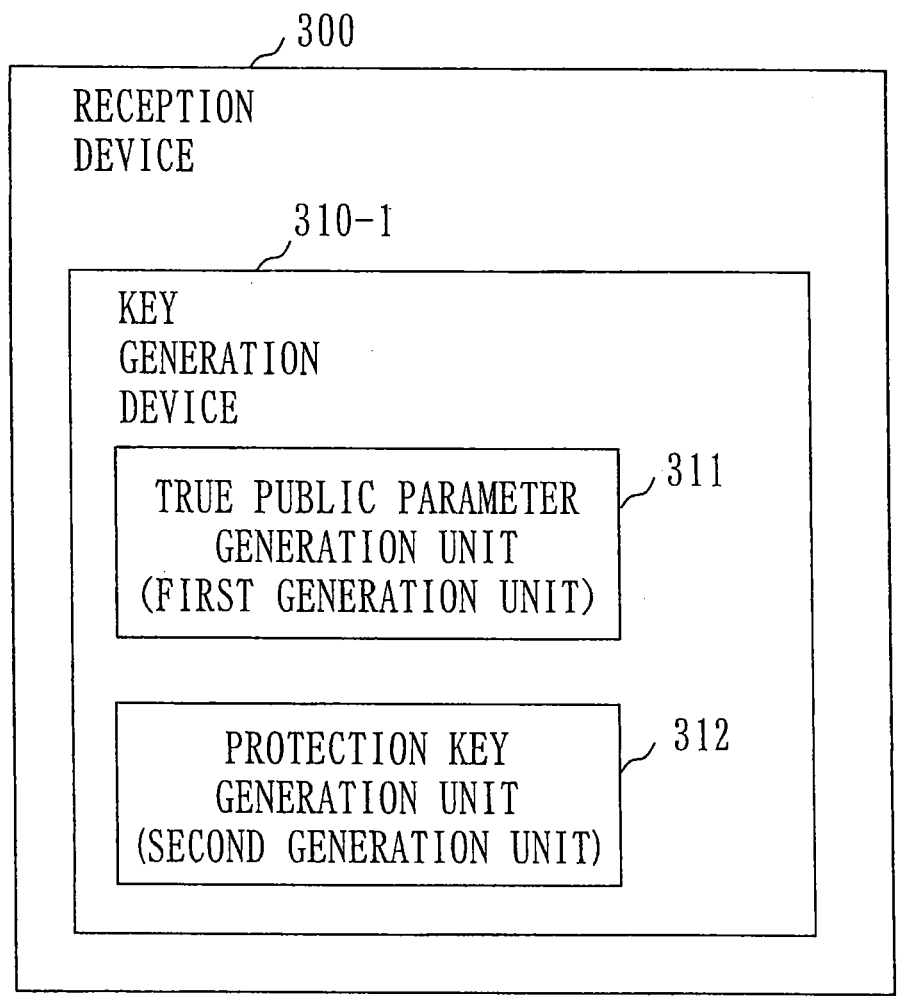
FIG. 9 is a block diagram of a key generation device 310-1 according to the first embodiment.

FIG. 9 is a block diagram of a key generation device 310-1 provided at the reception device 300. As shown in FIG. 9, the reception device 300 is provided with the key generation device 310-1. The key generation device 310-1 includes a true public parameter generation unit 311 (first generation unit) generating the true public parameter PP and a protection key generation unit 312 (second generation unit) generating the protection key PK'.

As has been discussed above, the public parameter PK is key information used by the secret search system 1000 (FIG. 7) comprising:

the transmission device 100 generating and sending the encrypted data and the encryption tag which is an encrypted keyword for searching the encrypted data;

the server 200 receiving from the transmission device 100 and storing the encrypted data and the encryption tag, and as well conducting a secret search in response to a request for the secret search; and the reception device 300 generating the trapdoor which is data corresponding to the digital signature of the keyword and also data requesting the server 200 to conduct the secret search for the encrypted data, sending the trapdoor to the server 200, and receiving the result of the secret search from the server 200.

Then, the public parameter PK is, as shown in FIG. 2, the key information including the true public parameter PP and the protection key PK'. Further, as shown in FIGS. 7 and 8, the true public parameter PP is used for the generation of the encryption tag by the transmission device 100, the generation of the trapdoor by the reception device 300, and the secret search by the server 200. Further, the protection key PK' is used for the generation of the encryption tag by the transmission device 100 and the generation of the trapdoor by the reception device 300, but is not used for the secret search by the server 200. Then, in the key generation device 310-1, the true public parameter generation unit 311 and the protection key generation unit 312 respectively generate the true public parameter PP and the protection key PK' separately. Only the true public parameter PP which is separately generated is distributed, as shown in FIG. 6, to the server 200 from the reception device 300. This operation increases the safety of the trapdoor.

Figure 10:
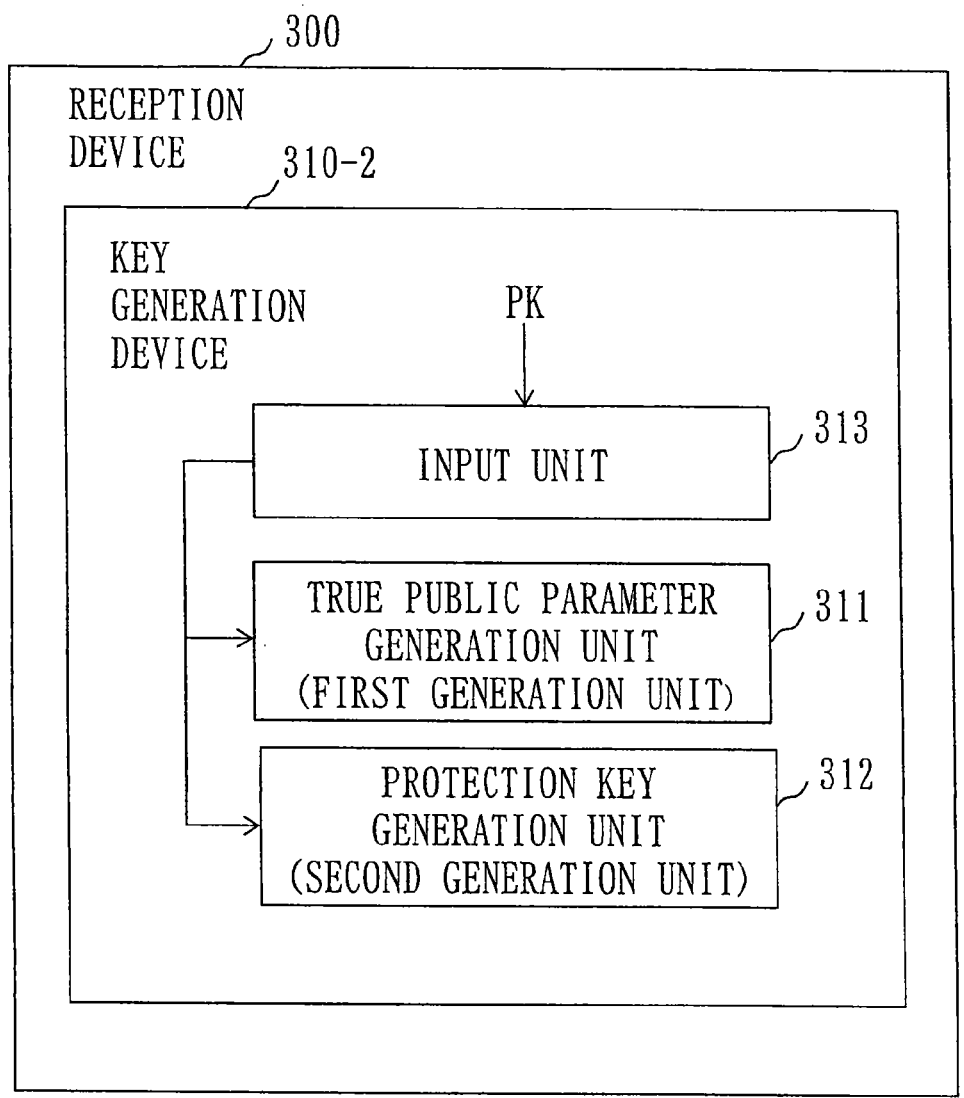
FIG. 10 is a block diagram of a key generation device 310-2 according to the first embodiment.

FIG. 10 is a diagram showing a case where the reception device 300 is provided with a key generation device 310-2. With respect to the key generation device 310-1, the key generation device 310-2 further includes an input unit 313 to which the public parameter PK is input. The input unit 313 receives the public parameter PK which has been already generated. The true public parameter generation unit 311 generates the true public parameter PP by extracting the true public parameter PP from the public parameter PK received by the input unit 313. The protection key generation unit 312 generates the protection key PK' by extracting the protection key PK' from the public parameter PK received by the input unit 313. By the key generation device 310-2, the true public parameter PP and the protection key PK' can be separated from the public parameter PK which has been already generated. This operation increases the safety of the trapdoor.

Figure 11:
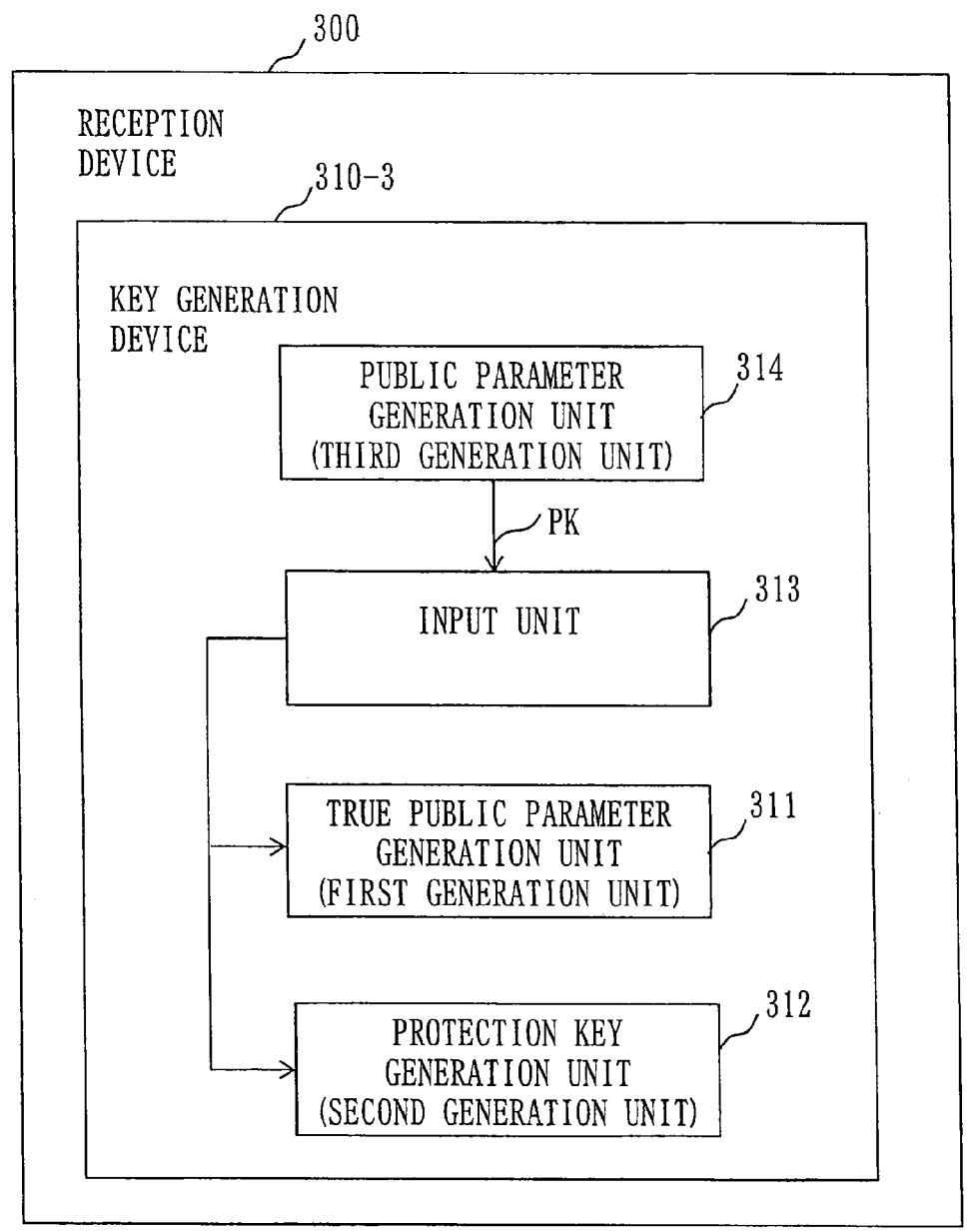
FIG. 11 is a block diagram of a key generation device 310-3 according to the first embodiment.

FIG. 11 is a diagram showing a case where the reception device 300 is provided with a key generation device 310-3. With respect to the key generation device 310-2, the key generation device 310-3 includes a public parameter generation unit 314 (third generation unit) to generate the public parameter PK. The input unit 313 receives the public parameter PK generated by the public parameter generation unit 314. The true public parameter generation unit 311 generates the true public parameter PP by extracting the true public parameter PP from the public parameter PK received by the input unit 313, and the protection key generation unit 312 generates the protection key PK' by extracting the protection key PK' from the public parameter PK received by the input unit 313. By the key generation device 310-3, the public parameter PK generated by the public parameter generation unit 314 is distributed to the sender 100, and the true public parameter PP generated by the true public parameter generation unit 311 is distributed to the server 200. Therefore, the safety of the trapdoor is increased.

With reference to FIG. 6, the distribution method of the public parameter PK to each entity according to the first embodiment has been explained. By using the distribution method like this, the public parameter PK is distributed to the sender 100, only the true public parameter PP out of the public parameter PK is distributed to the server 200. Further, with reference to FIGS. 9 to 11, the key generation device 310-1 to 310-3 which separate and generate the true public parameter PP and the protection key PK' out of the public parameter PK. The key generation devices 310-1 to 310-3 generate the true public parameter PP separately from the protection key PK'. Therefore, in FIG. 6, only the true public parameter PP can be distributed to the server 200.

The above distribution method of the public parameter PK to each entity (also the key generation device) is used, and thereby the safety of the trapdoor is increased with respect to the server 200 which receives the trapdoor. Hereinafter, the reason why the above effect is obtained by the distribution method of FIG. 6 will be briefly discussed. Although it is possible to provide a strict safety certificate, such certificate is omitted in this description; an intuitive explanation will be provided.

In the conventional PEKS like Non-Patent Literature 2, it is assumed that all entities can obtain the public parameter PK. Consequently, the protection key PK' (FIG. 2) of the first embodiment can be obtained not only by the sender 100 but also by the server 200. This means the server 200 can freely encrypt an appropriate keyword using the encryption algorithm. That is, the server 200 has exactly the same authority with the sender 100.

In this case, the server 200 can extract information related to the keyword included inside the trapdoor from the received trapdoor using the means which will be discussed in the following. To facilitate the explanation, a case of the exact match search will be explained.

(1) The server 200 which receives the trapdoor from the receiver 300 estimates first a keyword which may be included inside the trapdoor.

(2) Then, the server 200 generates the encryption tag for the keyword using also the protection key PK'.

(3) Then, the server 200 applies the decryption algorithm to the trapdoor and the encryption tag and observes the output. If the output is 1, the estimated keyword is found to match the keyword included inside the trapdoor. If the output is 0, the estimated keyword is found not to match the keyword included inside the trapdoor, and the server 200 estimates the next keyword to repeat the same process.

(4) The above process is continued as long as the capacity of the server 200 permits, and thereby the candidates of the keyword can be gradually narrowed. Further, in a case where it is previously known that a kind of the keyword is limited to some extent, information of the keyword will be completely known sooner or later by the above method. In this manner, the information related to the keyword is extracted from the trapdoor.

On the other hand, the distribution method of the public parameter PK as shown in FIG. 6 of the first embodiment is used, and thereby the attack like the above can be prevented. This is because even if the server 200 estimates the keyword, the server 200 does not have the protection key PK' which is required for confirming the estimated keyword. Here, by looking at the description of each algorithm shown in FIGS. 3 to 5, it is possible for those skilled in the art to understand there is no means to confirm the estimated keyword if means other than the encryption is used.

Hereinbefore, the reason why the effect to increase the safety of the trapdoor can be obtained has been briefly discussed. Here, the distribution method of the public parameter PK shown in the first embodiment is used, and thereby another effect can be obtained such that the communication volume between the receiver 300 and the server 200 can be reduced.

Embodiment 2

In the first embodiment, a method to secure the safety of the trapdoor in PEKS described in Non-Patent Literature 2 has been disclosed. In the second embodiment, in a case where the functional cryptosystem described in Non-Patent Literature 3 is used for PEKS, a method to secure the safety of the trapdoor will be disclosed. The system configuration is FIG. 1.

First, among the algorithms of the functional cryptosystem described in Non-Patent Literature 3, a part related to the second embodiment will be explained. Hereinafter, it is assumed that the algorithm of "the functional cryptosystem described in Non-Patent Literature 3" means the algorithm described in "Proposed (Basic) IPE Scheme" in Section 4 of Non-Patent Literature 3. Here, in order to use the functional cryptosystem for PEKS, a part of the algorithm is modified, and the modified algorithm will be described. In particular, a part of the encryption (Enc) algorithm and the decryption (Dec) algorithm are modified to simplify the algorithms. Consequently, the setup (Setup) algorithm and the key generation (KeyGen) algorithm are the same as described in Non-Patent Literature 3. For the purpose of reference, FIG. 12 shows a list of the algorithms used for the functional cryptosystem and the algorithms used for PEKS with respect to Non-Patent Literature 2 and Non-Patent Literature 3.

Here, concepts, notes, and notations which are necessary for explaining the second embodiment will be discussed. Note that, to facilitate the explanation, only a case of the symmetric pairing group will be discussed similarly to Non-Patent Literature 3. Further, the group operation will be described multiplicatively.

(1) q is a prime number.
(2) The finite field of an order q is $F_q$.
(3) A symmetric pairing group of the order q is G.
(4) A generator of G is g.
(5) A pairing operation on G is shown as $e: G \times G \to G_T$.
   Note that $G_T$ is a cyclic group of the order q after the pairing operation.
(6) A dual pairing vector space (DPVS) configured by a direct product of symmetric pairing groups is shown as
$V = G \times \ldots \times G$
(7) When V is N dimensional DPVS,
a standard basis of V is shown as
$A = (a_0, \ldots, a_{N-1})$
   Note that $a_i$ (i=0, ..., N−1) is N dimensional vector configured by $$a_i = (\overbrace{1, \ldots 1}^{i}, g, \overbrace{1, \ldots, 1}^{N-i-1}).$$ [Formula 6]

(8) A regular matrix of order N composed of the random numbers on $F_q$ is shown as $X = (X_{i,j})$
(9) A random basis XA obtained by multiplying X to A is shown as
$B = (b_0, \ldots, b_{N-1})$.
   That is, $$b_i = \Sigma_{j=0}^{N-1} X_{i,j} a_j$$ [Formula 7]

where each of $b_i$ (i=0, ..., N−1) is N dimensional vector.
(10) A matrix obtained by multiplying a random number ψ to a transpose inverse matrix $(X^T)^{-1}$ of X is shown as
$\theta = (\theta_{i,j}) = \psi (X^T)^{-1}$.
(11) A basis obtained by multiplying θ to A is shown as
$B^* = (b^*_0, \ldots, b^*_{N-1})$.
   That is, $$b^*_i = \Sigma_{j=0}^{N-1} \theta_{i,j} a_j$$ [Formula 8]

where each of $b^*_i$ (i=0, ..., N−1) is N dimensional vector. $B^*$ is called as a dual basis of B.
(12) With respect to the random basis B,
a linear combination having a coefficient of
a vector on $F_q$
$\vec{x} = (x_0, \ldots, x_{N-1}) \in F_q^N$
is shown as
$(x_0, \ldots, x_{N-1})_B$.
   That is, $$(x_0, \ldots, x_{N-1})_B = \Sigma_{i=0}^{N-1} x_i b_i$$ [Formula 9]

(13) Similarly, with respect to the dual basis of $B^*$ of B,
a linear combination having a coefficient of
a vector on $F_q$
$\vec{v} = (v_0, \ldots, v_{N-1}) \in F_q^N$
is shown as
$(v_0, \ldots, v_{N-1})_{B^*}$.
   That is, $$(v_0, \ldots, v_{N-1})_{B^*} = \Sigma_{i=0}^{N-1} v_i b^*_i$$ [Formula 10]

(14) The pairing operation of two vectors on V:
$g = (g_0, \ldots, g_{N-1})$ and
$h = (h_0, \ldots, h_{N-1})$
is shown as e(g,h).
   That is, $$e(g,h) = \Pi_{i=0}^{N-1} e(g_i, h_i)$$ [Formula 11]

(Configuration of PK and SK)
Subsequently, with reference to FIG. 13, among the algorithms of the functional cryptosystem described in Non-Patent Literature 3, configuration of the public parameter PK and the master secret key SK which are generated by executing the setup algorithm will be explained.

FIG. 13 shows the configuration of the public parameter PK and the master secret key SK according to the second embodiment. Similarly to the first embodiment, the receiver 300 generates the public parameter PK and the master secret key SK as discussed above.

In FIG. 13, the public parameter PK is composed of, similarly to the first embodiment, the true public parameter PP and the protection key PK'. The true public parameter PP is
PP=(q, V, $G_T$, A, e, $g_r$)
Note that
(1) q is a prime number.
(2) V is a (4n+2) dimensional (n is the number of dimensions of the predicate vector used for the generation of the encryption tag and the generation of the trapdoor) dual pairing vector space.
(3) $G_T$ is a cyclic group of the order q after the pairing operation.
(4) A is a standard basis of V.
(5) e shows a pairing operation.
(6) $g_T$ shows a generator of $G_T$.
Further,
the protection key PK' is composed of
$B\hat{} = (b_0, \ldots, b_n, b_{4n+1})$.
Note that "^" of $B\hat{}$ shows that it is generated using a part of the above basis B.
Further, the master secret key SK is composed of
$B^{*\hat{}} = (b^*_0, b^*_n, b^*_{3n+1}, \ldots, b^*_{4n})$
Note that "^" of $B^{*\hat{}}$ shows that it is generated using a part of the above basis
$B^*$.
Here, these are generated by the algorithm $G_{ob}$ ($\lambda$, 4n+2) described in Non-Patent Literature 3.

(Encryption Tag Generation Algorithm)

Figure 14:
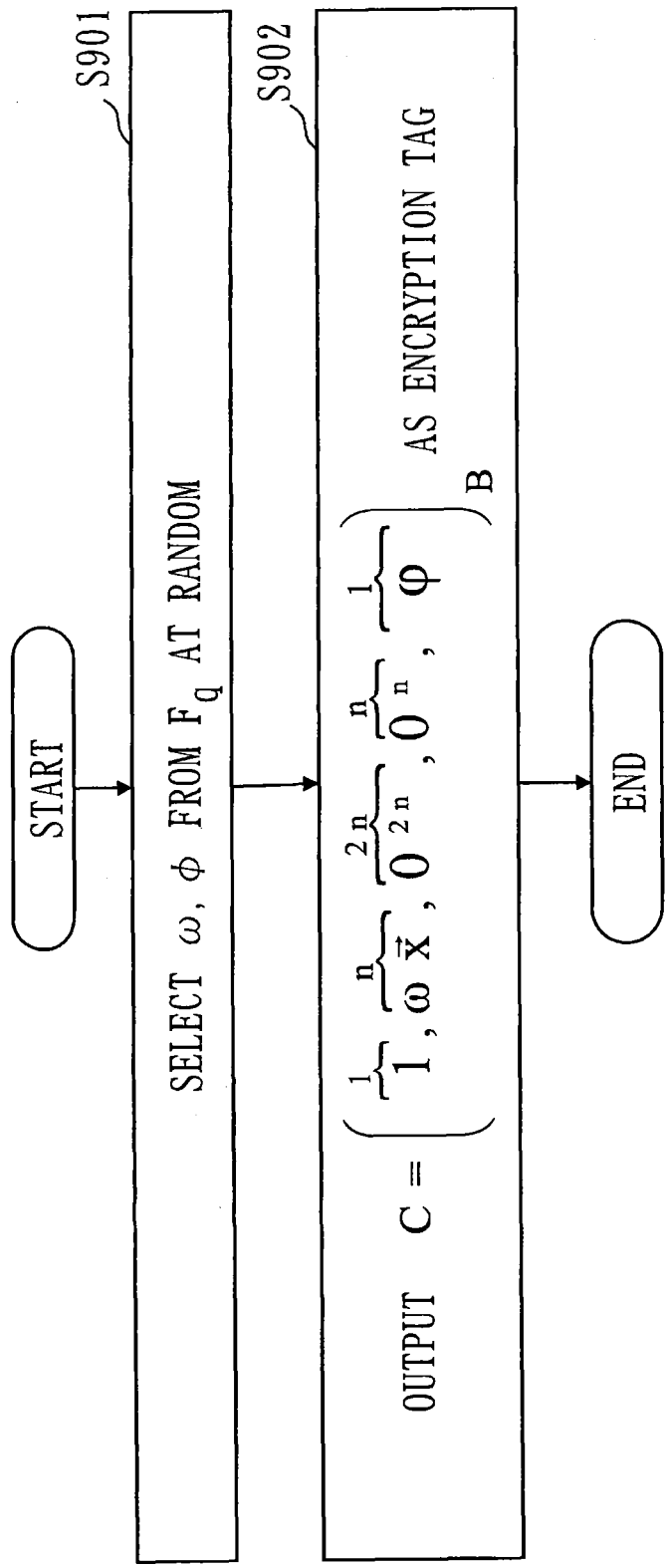
FIG. 14 is a flowchart showing an encryption (Enc) algorithm used for generating an encryption tag according to the second embodiment.

Next, with reference to FIG. 14, among the algorithms of the functional cryptosystem described in Non-Patent Literature 3, the procedure of the encryption (Enc) algorithm which is an algorithm used by the sender 100 to generate the encryption tag will be discussed. Accordingly, the subject of the operation of FIG. 14 is the sender (the transmission device). When generating the encryption tag, the sender 100 generates the encryption tag using the public parameter PK (both of PP and PK') of FIG. 13 distributed from the receiver 300. Here, in order to use the functional cryptosystem for PEKS, a part of the algorithm is modified, and the modified algorithm will be described.

FIG. 14 is a flowchart showing the procedure of the encryption (Enc) algorithm.

In FIG. 14, it is assumed that the sender 100 wants to encrypt
the attribute vector $\vec{x} = (x_1, x_2, \ldots, x_n) \in F_q^n$
to generate an encryption tag.
Note that
the attribute vector $\vec{x} \in F_q^n$
is data corresponding to the keyword to be encrypted, which is data having a different format according to the contents of the search such as an exact match search, an AND search, an OR search, and the like.
For instance, in case of the exact match search of one keyword,
$\vec{x} = (1, \text{keyword})$
(1) At this time, the sender 100 selects, first at the step S901, $\omega$ and $\phi$ at random from $F_q$.
(2) Next, at the step S902, the sender 100 outputs $$C = \left(\overset{1}{1}, \overset{n}{\omega\vec{x}}, \overset{2n}{0^{2n}}, \overset{n}{0^n}, \overset{1}{\varphi}\right)_B \quad \text{[Formula 12]}$$

as the encryption tag.

In the procedure of the encryption (Enc) algorithm, for performing the processes of the steps S901 and S902, the public parameter PK of FIG. 13 is required. In particular, for performing the process of the step S902, the protection key PK' of the public parameter PK is required.

(Generation of the Trapdoor)

Figure 15:
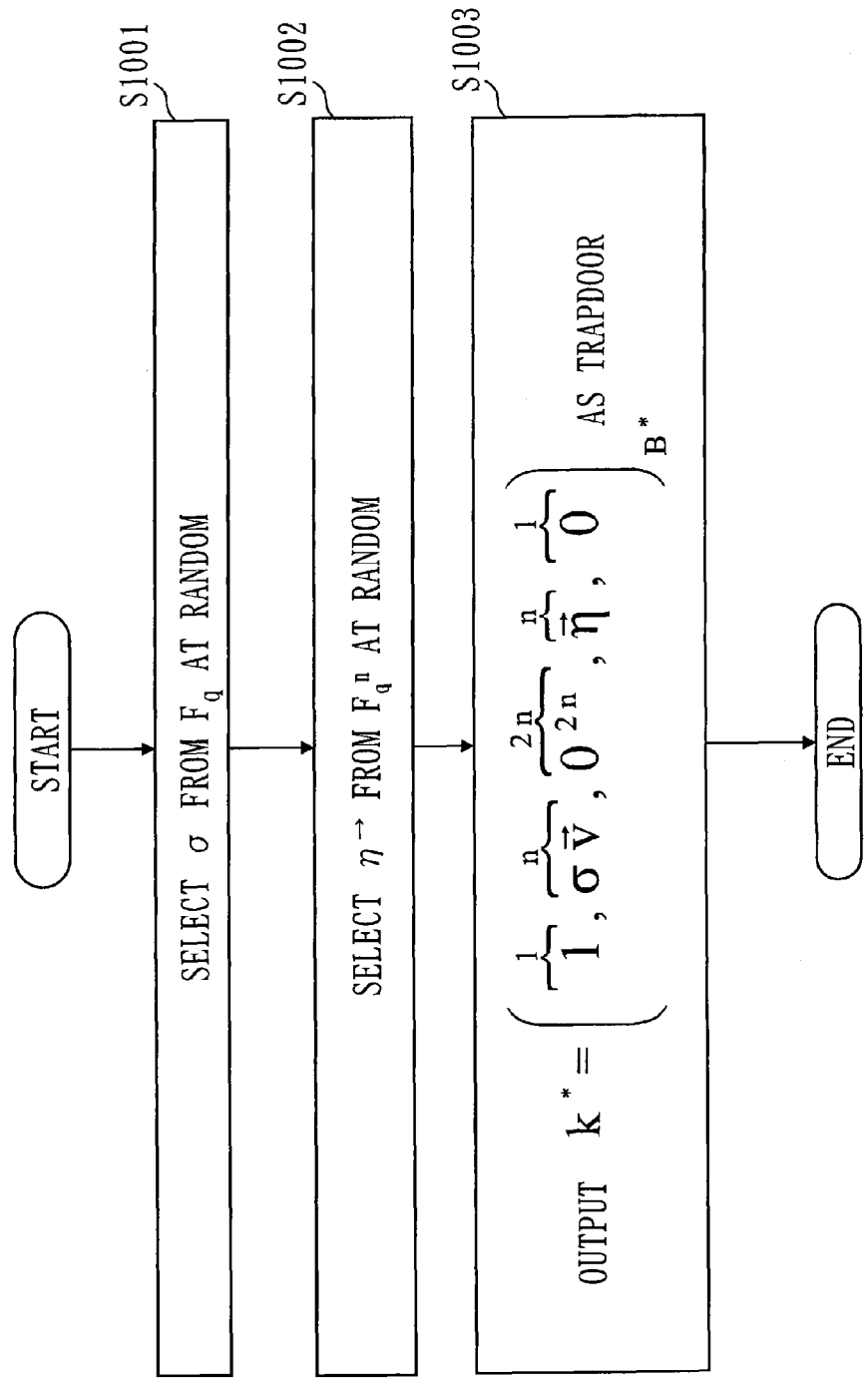
FIG. 15 is a flowchart showing a key generation (GenKey) algorithm used for generating a trapdoor according to the second embodiment.

Next, with reference to FIG. 15, among the algorithms of the functional cryptosystem described in Non-Patent Literature 3, the procedure of the key generation (KeyGen) algorithm which is an algorithm used by the receiver 300 to generate the trapdoor will be discussed. Accordingly, the subject of the operation of FIG. 15 is the receiver (the reception device). The receiver 300 generates the trapdoor using the public parameter PK (both PP and PK') shown in FIG. 13 and the master secret key SK.

FIG. 15 is a flowchart showing the procedure of the key generation (KeyGen) algorithm.

In FIG. 15, it is assumed that the receiver 300 wants to digitally sign the predicate vector $\vec{v} = (v_1, v_2, \ldots, v_n) \in F_q^n$
to generate the trapdoor.
Note that
the predicate vector $\vec{v} \in F_q^n$
is data corresponding to the keyword to be searched, which is data having a different format according to the contents of the search such as an exact match search, an AND search, an OR search, and the like.
For instance, in case of the exact match search of one keyword,
$\vec{v} = (\text{keyword}, N-1)$.
(1) At this time, the receiver 300 selects, first at the step S1001, $\sigma$ at random from $F_q$.
(2) Next, the receiver 300 selects, at the step S1002, $\vec{\eta}$ at random from $F_q^n$.
(3) Finally, the receiver 300 outputs at the step S1003

$$k^* = \left(\overset{1}{1}, \overset{n}{\sigma\vec{v}}, \overset{2n}{0^{2n}}, \overset{n}{\vec{\eta}}, \overset{1}{0}\right)_{B^*} \quad \text{[Formula 13]}$$

as the trapdoor.

(Secret Search by the Server 200)

Figure 16:
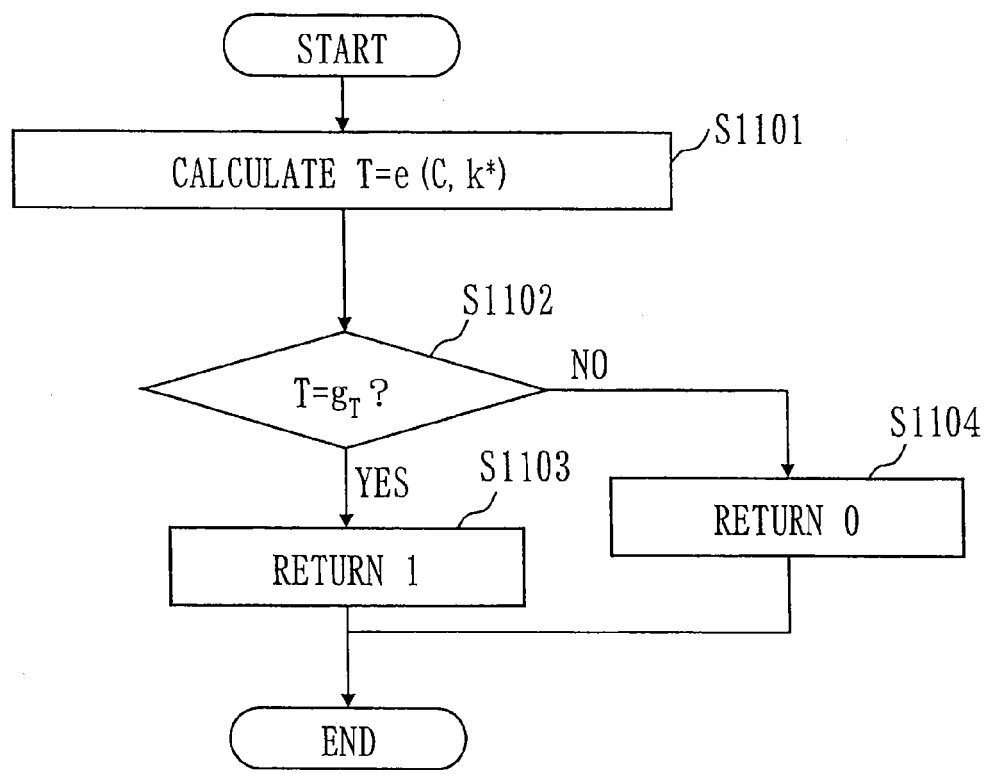
FIG. 16 is a flowchart showing a decryption (Dec) algorithm used for the secret search by the server 200 according to the second embodiment.

Next, with reference to FIG. 16, the procedure of the decryption (Dec) algorithm which is an algorithm used by the server 200 to conduct the secret search will be discussed. Accordingly, the subject of the operation of FIG. 16 is the server 200. In the secret search by the server 200, the server 200 conducts, as well as the first embodiment, the secret search for each of a plurality of encryption tags sent from the senders based on one trapdoor sent from the receiver. In case of the secret search, the true public parameter PP of the public parameter PK (FIG. 13) is required. The secret search by the server 200 does not require the protection key PK', which is the same as the first embodiment. Here, in order to use the functional cryptosystem for PEKS, a part of the algorithm is modified, and the modified algorithm will be described.

FIG. 16 is a flowchart showing the procedure of the decryption (Dec) algorithm.

(1) In FIG. 16, the server 200 calculates, first at the step S1101,
$T = e(C, k^*)$.
(2) Next, the server 200 determines if $T = g_T$ at the step S1102. If $T = g_T$ holds, 1 is returned and the process terminates at the step S1103. If $T = g_T$ does not hold, 0 is returned and the process terminates at the step S1104.

In the procedure of the decryption (Dec) algorithm, the public parameter PK of FIG. 13 is required for implementing the processes of the steps S1101 and S1102. However, only the part of the true public parameter PP out of the public parameter PK is required, and the part of the protection key PK' is not required. Hereinbefore, among the algorithms of the functional cryptosystem described in Non-Patent Literature 3, the part related to the second embodiment has been explained.

(Distribution Method of the Public Parameter PK to Each Entity)

Next, the distribution method of the public parameter PK to each entity according to the second embodiment will be explained. The distribution method of the public parameter PK to each entity of the second embodiment is the same as FIG. 6 of the first embodiment. That is, by the processes from the step S601 to the step S603, the processes of the step S611 and the step S621 in FIG. 6, the public parameter PK is distributed to each sender 100, and the true public parameter PP is distributed to the server 200. The difference with the first embodiment is the difference of specific contents of the public parameter PK, which is caused by the difference of the algorithms that have been already discussed.

Further, it is as a matter of course that the key generation devices 310-1 to 310-3 which have been explained in FIG. 9 to FIG. 11 of the first embodiment can be also applied to the second embodiment. The public parameter PK in such a case is the public parameter PK of FIG. 13.

The distribution method of the public parameter PK to each entity which has been discussed in the above second embodiment is used, and thereby, in a case where the functional cryptosystem described in Non-Patent Literature 3 is used for PEKS, it is effective to increase the safety of the trapdoor for the server 200 which receives the trapdoor.

Further, the distribution method of the public parameter PK shown in the second embodiment is used, and thereby it is also effective to reduce the communication volume between the receiver 300 and the server 200.

Hereinbefore, each of the first embodiment and the second embodiment has been explained. To summarize, the invention related to the above embodiments provides a general method for securing the safety of the trapdoor in PEKS. That is, the invention related to the above embodiments provides, in cases where the algorithm of PEKS of Non-Patent Literature 2 explained in the first embodiment or the algorithm of the functional cryptosystem used for PEKS such as Non-Patent Literature 3 explained in the second embodiment, a general method for securing the safety of the trapdoor.

Here, it is easy for those skilled in the art to understand the invention of the first embodiment and the second embodiment can be applied to, not only Non-Patent Literature 2 or Non-Patent Literature 3, various algorithms which are generally called as PEKS or the functional cryptosystem. Then, it is effective to secure the safety of the trapdoor in a case where the functional cryptosystem is used for PEKS. In a case where the functional cryptosystem is used as itself, it is also effective to protect the information related to the authority of the user for the decryption key, which can be also easily understood by those skilled in the art.

Embodiment 3

Figure 17:
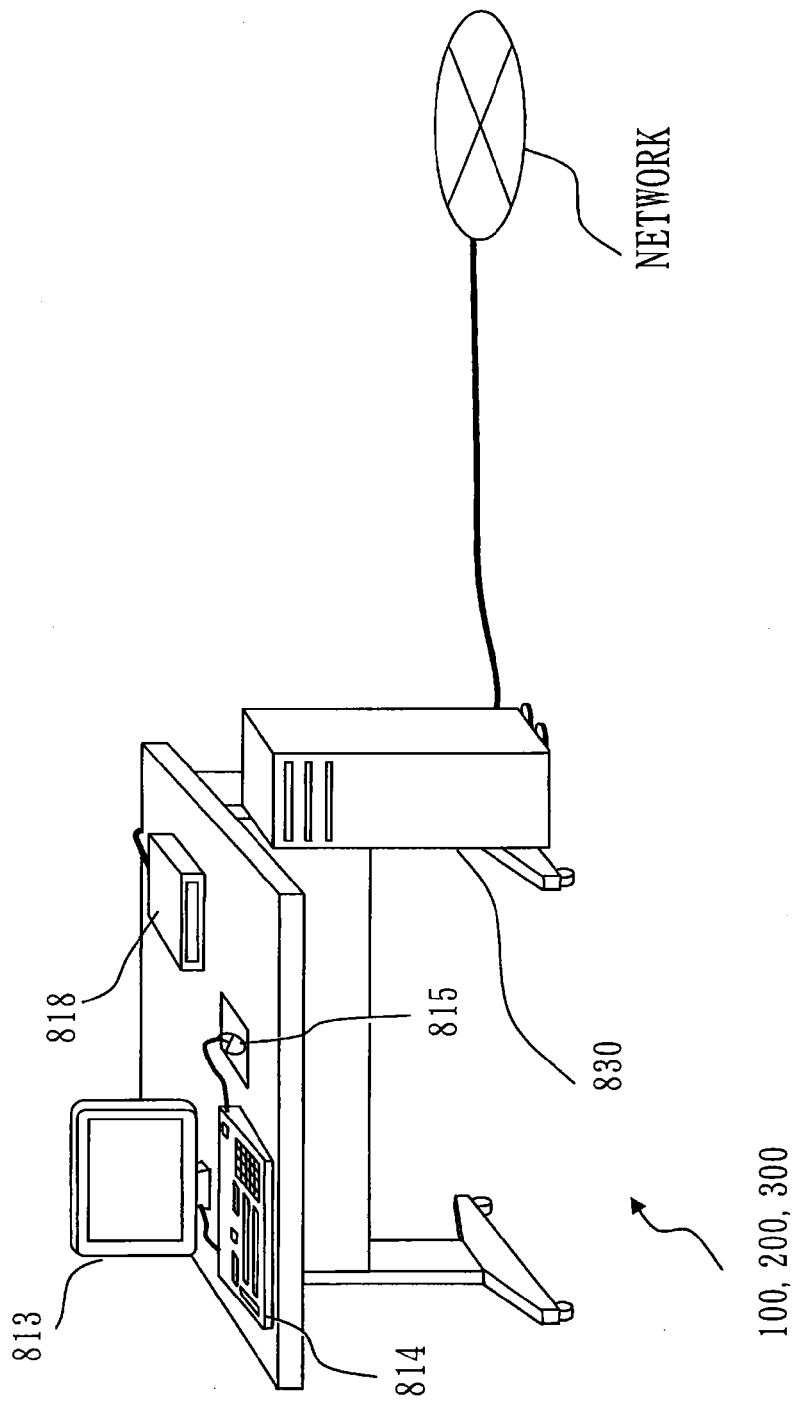
FIG. 17 shows an external appearance of the transmission device 100, the reception device 300, and the like according to a third embodiment.
Figure 18:
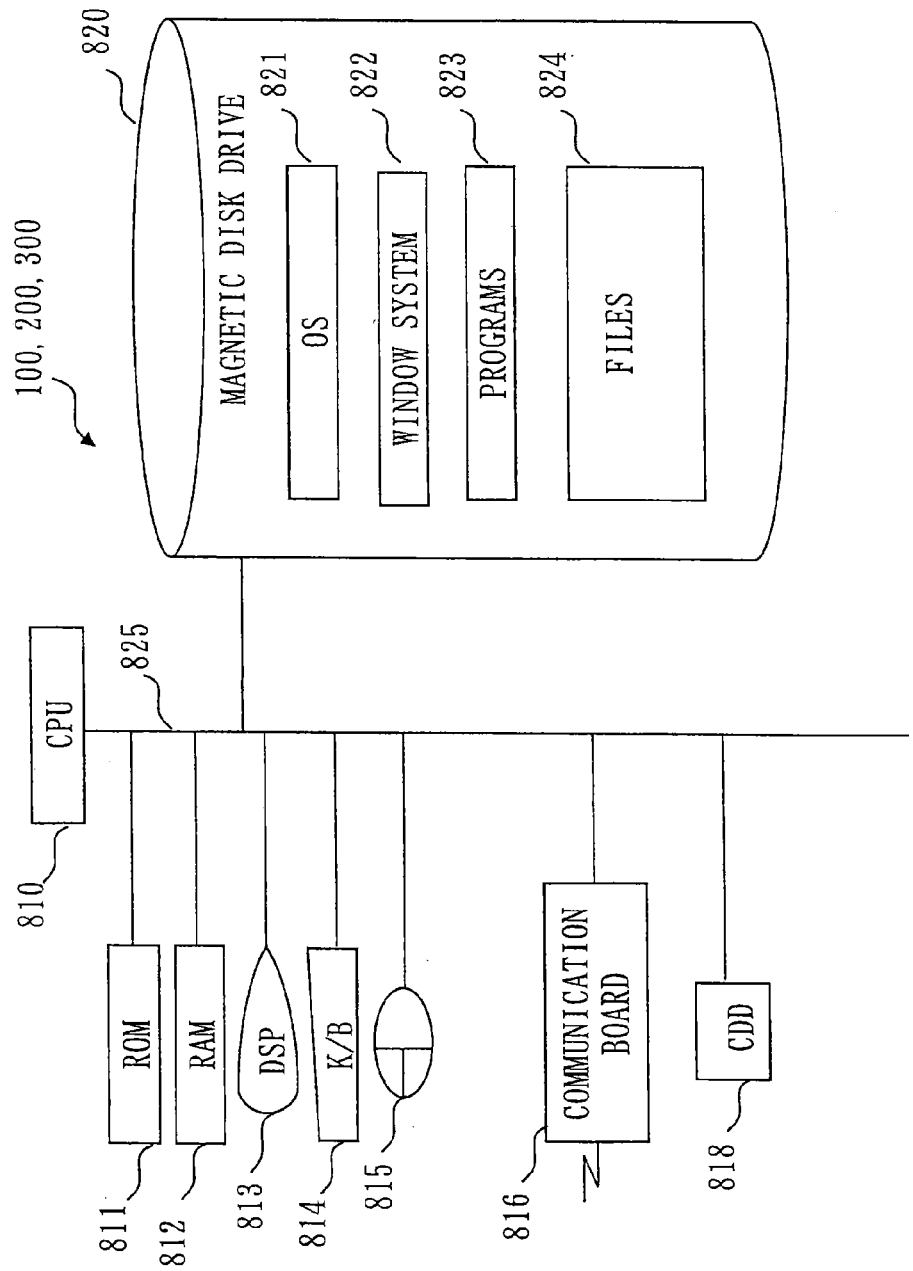
FIG. 18 shows a hardware configuration of the transmission device 100, the reception device 300, and the like according to the third embodiment.

With reference to FIGS. 17 and 18, a third embodiment will be explained. The third embodiment will explain the hardware configuration of the transmission device 100, the reception device 300, and the server 200, each being a computer. Since the transmission device 100, the reception device 300, and the server 200 are similar computers, the reception device 300 is assumed to be an example in the following explanation. The explanation of the reception device 300 can be applied to the transmission device 100 and the server 200.

FIG. 17 shows an example of an external appearance of the reception device 300 being a computer. FIG. 18 shows an example of hardware resource of the reception device 300.

In FIG. 17 showing the external appearance, the reception device 300 includes hardware resource such as a system unit 830, a display device 813 having a display screen such as CRT (Cathode Ray Tube) and LCD (Liquid Crystal), a keyboard 814 (K/B), a mouse 815, a compact disk drive 818 (CDD), and the like, and they are connected via cables or signal lines. A system unit 830 is connected to the network.

Further, in FIG. 18 showing the hardware resource, the reception device 300 includes a CPU 810 (Central Processing Unit) which executes programs. The CPU 810 is connected, via a bus 825, to a ROM (Read Only Memory) 811, a RAM (Random Access Memory) 812, the display device 813, the keyboard 814, the mouse 815, a communication board 816, the CDD 818, and a magnetic disk drive 820, and controls these hardware devices. The magnetic disk drive 820 can be replaced with memory devices such as an optical disk drive and a flash memory.

The RAM 812 is an example of a volatile memory. A storage medium such as the ROM 811, the CDD 818, the magnetic disk drive 820, and the like are examples of a non-volatile memory. These are examples of a "memory device", a memory unit, a storage unit, and a buffer. The communication board 816, the keyboard 814, and the like are examples of an input unit and an input device. Further, the communication board 816, the display device 813, and the like are examples of an output unit and an output device. The communication board 816 is connected to the network.

The magnetic disk drive 820 stores an operating system 821 (OS), a window system 822, programs 823, and files 824. Programs of the programs 823 are executed by the CPU 810, the operating system 821, and the window system 822.

The programs 823 store programs to execute the functions explained in the above embodiments as "unit". The programs are read and executed by the CPU 810.

The files 824 store information such as "determination result", "calculation result", "extraction result", "generation result", "processing result", and the like, data, signal values, variable values, and parameters as each item of "file" or "database". "File" or "database" are stored in a recording medium such as a disk or a memory. Information, data, signal values, variable values, and parameters stored in the storage medium such as a disk or a memory are read by the CPU 810 via a read/write circuit to the main memory or the cache memory and used for the operation of the CPU such as extraction, search, reference, comparison, computation, calculation, processing, output, printing, display, and so on. Information, data, signal values, variable values, and parameters are temporarily stored in the main memory, the cache memory, or the buffer memory during the operation of the CPU such as extraction, search, reference, comparison, computation, calculation, processing, output, printing, and display.

Further, in the above explanation of the embodiments, the data and the signal values are recorded in the recording medium such as a memory of the RAM 812, a compact disk of the CDD 818, a magnetic disk of the magnetic disk drive 820, and others like an optical disk, a mini-disk, a DVD (Digital Versatile Disk). Further, the data and the signals are transmitted on-line via a transmission medium such as the bus 825, the signal lines, the cables, and others.

Further, in the explanation of the above embodiments, what has been explained as a "unit" can be "means", and further, can be also a "step", a "procedure", and a "process". That is, the "unit" can be implemented by only software, by a combination of the software and the hardware, and further by a combination with the firmware. The firmware and the software are stored as the programs in the recording medium such as the magnetic disk, the flexible disk, the optical disk, the compact disk, the mini disk, the DVD, and the like. The programs are read by the CPU 810, and executed by the CPU 810. That is, the programs are to function a computer to be the "unit" which has been discussed above. Or the programs are to cause the computer to perform the procedure or the method of "unit".

In the above embodiments, the reception device 300 and the like has been explained; however, it is as a matter of course that the reception device 300 (the key generation device) can be considered as a key generation program.

In the above embodiments, the following key generation device has been explained: the key generation device which generates the public parameter of the functional cryptosystem or PEKS with separating the true public parameter and the protection key.

In the above embodiments, the following key generation device has been explained: the key generation device which separates the existing public parameter of the functional cryptosystem or PEKS into the true public parameter and the protection key.

In the above embodiments, the following public parameter distribution method has been explained: the public parameter distribution method by which the true public parameter and the protection key are distributed to the sender 100, but only the true public parameter is distributed to the server device.

REFERENCE SIGNS LIST

1000: secret search system; 100, 101-1, 100-*n*: transmission devices; 200: server; 300: reception device; 310-1, 310-2, 310-3: key generation devices; 311: true public parameter generation unit; 312: protection key generation unit; 313: input unit; 314: public parameter generation unit; and 400: network.

The invention claimed is:

1. A key generation device of key information used in a secret search system having:
    a transmission device generating encrypted data and an encryption tag which is an encrypted keyword for searching the encrypted data;
    a server device receiving from the transmission device and storing the encrypted data and the encryption tag, and also conducting a secret search in response to a request for the secret search; and
    a reception device generating a trapdoor which is data corresponding to a digital signature of the keyword and also data requesting the server device to conduct the secret search of the encrypted data, sending the trapdoor to the server device, and receiving a result of the secret search from the server device,
    the key generation device comprising:
    a first generation unit which generates a true public parameter PP included in a public parameter PK, the public parameter PK being the key information including:
    the true public parameter PP used for encryption of the keyword by the transmission device, generation of the trapdoor by the reception device, and the secret search by the server device; and
    a protection key PK' used for the encryption of the keyword by the transmission device and the generation of the trapdoor by the reception device; and
    a second generation unit which generates the protection key PK' included in the public parameter PK separately from the true public parameter PP generated by the first generation unit.

2. The key generation device of claim 1, further comprising an input unit which receives the public parameter PK,
    wherein the first generation unit generates the true public parameter PP by extracting the true public parameter PP from the public parameter PK received by the input unit, and
    wherein the second generation unit generates the protection key PK' by extracting the protection key PK' from the public parameter PK received by the input unit.

3. The key generation device of claim 2, further comprising a third generation unit which generates the public parameter PK,
    wherein the input unit inputs the public parameter PK generated by the third generation unit.

4. A key generation program of key information used in a secret search system having:
    a transmission device generating encrypted data and an encryption tag which is an encrypted keyword used for searching the encrypted data;
    a server device receiving from the transmission device and storing the encrypted data and the encryption tag, and also conducting a secret search in response to a request for the secret search; and
    a reception device generating a trapdoor which is data corresponding to a digital signature of the keyword and also data requesting the server device to conduct the secret search of the encrypted data, sending the trapdoor to the server device, and receiving a result of the secret search from the server device,
    the key generation program having a computer to execute:
    a first generation process which generates a true public parameter PP included in a public parameter PK, the public parameter PK being the key information including:
    the true public parameter PP used for encryption of the keyword by the transmission device, generation of the trapdoor by the reception device, and the secret search by the server device; and
    a protection key PK' used for the encryption of the keyword by the transmission device and the generation of the trapdoor by the reception device; and
    a second generation process which generates the protection key PK' included in the public parameter PK separately from the true public parameter PP generated by the first generation process.

5. A secret search system having:
    a transmission device generating encrypted data and an encryption tag which is an encrypted keyword used for searching the encrypted data;
    a server device receiving from the transmission device and storing the encrypted data and the encryption tag, and also conducting a secret search in response to a request for the secret search; and
    a reception device generating a trapdoor which is data corresponding to a digital signature of the keyword and also data requesting the server device to conduct the secret search of the encrypted data, sending the trapdoor to the server device, and receiving a result of the secret search from the server device,
    wherein the reception device comprises a key generation device of key information used in the secret search system, the key generation device comprising:

a first generation unit which generates a true public parameter PP included in a public parameter PK, the public parameter PK being the key information including:

the true public parameter PP used for encryption of the keyword by the transmission device, generation of the trapdoor by the reception device, and the secret search by the server device; and a protection key PK' used for the encryption of the keyword by the transmission device and the generation of the trapdoor by the reception device; and a second generation unit which generates the protection key PK' included in the public parameter PK separately from the true public parameter PP generated by the first generation unit.

6. The secret search system of claim 5, wherein, to the server device, out of the true public parameter PP and the protection key PK' generated by the key generation device, only the true public parameter PP is distributed.

7. The secret search system of claim 5, wherein, to the transmission device, the protection key PK' generated by the second generation unit of the key generation device is provided off-line.

8. The secret search system of claim 5, wherein, to the transmission device, the protection key PK' generated by the second generation unit of the key generation device is provided via an electronic bulletin board which can be browsed only by the transmission device.

9. A key distribution method of key information used in a secret search system having:

a transmission device generating encrypted data and an encryption tag which is an encrypted keyword for searching the encrypted data;

a server device receiving from the transmission device and storing the encrypted data and the encryption tag, and also conducting a secret search in response to a request for the secret search; and a reception device generating a trapdoor which is data corresponding to a digital signature of the keyword and also data requesting the server device to conduct the secret search of the encrypted data, sending the trapdoor to the server device, and receiving a result of the secret search from the server device, the key distribution method comprising:

out of a public parameter PK, the public parameter PK being the key information including:

a true public parameter PP used for encryption of the keyword by the transmission device, generation of the trapdoor by the reception device, and the secret search by the server device; and a protection key PK' used for the encryption of the keyword by the transmission device and the generation of the trapdoor by the reception device, distributing both the true public parameter PP and the protection key PK' to the transmission device; and distributing only the true public parameter PP to the server device.

* * * * *